US011724920B2

(12) United States Patent
Butler et al.

(10) Patent No.: US 11,724,920 B2
(45) Date of Patent: Aug. 15, 2023

(54) TELESCOPING BOOM SYSTEMS, DEVICES, AND METHODS

(71) Applicant: Roccor, LLC, Longmont, CO (US)

(72) Inventors: Kassi Butler, Longmont, CO (US); Bruce Davis, Boulder, CO (US); Thomas Jeffrey Harvey, Nederland, CO (US); Zachary McConnel, Centennial, CO (US); Andrew Tomchek, Erie, CO (US); Thomas J. Rose, Erie, CO (US)

(73) Assignee: Roccor, LLC, Longmont, CO (US)

( * ) Notice: Subject to any disclaimer, the term of this patent is extended or adjusted under 35 U.S.C. 154(b) by 306 days.

(21) Appl. No.: 16/929,966

(22) Filed: Jul. 15, 2020

(65) Prior Publication Data

US 2021/0039925 A1    Feb. 11, 2021

Related U.S. Application Data

(60) Provisional application No. 62/874,334, filed on Jul. 15, 2019.

(51) Int. Cl.
*G06F 7/00* (2006.01)
*B66C 23/70* (2006.01)

(52) U.S. Cl.
CPC .......... *B66C 23/708* (2013.01); *B66C 23/706* (2013.01)

(58) Field of Classification Search
CPC ...... B66C 23/708; B66C 23/706; B64G 1/222
USPC ........................................ 212/168, 292, 347
See application file for complete search history.

(56) References Cited

U.S. PATENT DOCUMENTS

| 2,784,987 | A | | 3/1957 | Corcoran |
|---|---|---|---|---|
| 2,888,111 | A | | 5/1959 | Evans |
| 3,361,456 | A | | 1/1968 | Durand |
| 3,474,833 | A | | 10/1969 | Garrette |
| 3,688,455 | A | | 9/1972 | Zebuhr |
| 3,796,016 | A | * | 3/1974 | Wu ............... B66C 23/705 52/118 |
| 4,047,821 | A | | 9/1977 | Hoke |
| 4,062,156 | A | | 12/1977 | Roth |
| 4,079,978 | A | | 3/1978 | McMullin |
| 4,254,423 | A | | 3/1981 | Reinhard |
| 4,385,849 | A | | 5/1983 | Crain |
| 4,587,526 | A | | 5/1986 | Ahl |
| 4,657,112 | A | | 4/1987 | Ream |
| 4,663,900 | A | | 5/1987 | Rehm |
| 4,793,197 | A | | 12/1988 | Petrovsky |

(Continued)

*Primary Examiner* — Yolanda R Cumbess
(74) *Attorney, Agent, or Firm* — Terry M. Sanks, Esq.; Beusse Sanks, PLLC

(57) ABSTRACT

Telescoping boom systems, devices, and methods are provided in accordance with various embodiments. For example, some embodiments include zero dead band telescoping boom systems, devices, and methods. Embodiments in general include hard stop preloading mechanisms for telescoping booms with multiple tube segments. Some embodiments provide components that facilitate the deployment sequencing of the multiple tube segments along with facilitating preloading of the multiple tube segments of a telescoping boom. The tools and techniques provided may be integrated into the multiple tube segments rather than being provided as a separate system. Some embodiments allow for precise deployment of the multiple tube segments of the telescoping boom systems, devices, and methods.

20 Claims, 18 Drawing Sheets

(56) References Cited

U.S. PATENT DOCUMENTS

| | | | |
|---|---|---|---|
| 4,871,138 A | 10/1989 | Sauter | |
| 5,163,650 A | 11/1992 | Adams | |
| 5,279,084 A | 1/1994 | Atsukawa | |
| 5,315,795 A | 5/1994 | Chae | |
| 6,095,714 A | 8/2000 | Spencer | |
| 7,299,589 B2 | 11/2007 | Campbell | |
| 8,549,812 B1 * | 10/2013 | Peng | H01Q 1/10 52/632 |
| 2003/0136885 A1 * | 7/2003 | Malizia | F16M 11/046 248/188.5 |
| 2005/0194503 A1 * | 9/2005 | Lee | F16M 11/26 248/188.5 |
| 2006/0213295 A1 * | 9/2006 | Blackwelder | F16H 25/2056 74/89.23 |
| 2015/0330870 A1 * | 11/2015 | Hemerson | G01M 17/0074 73/116.01 |

* cited by examiner

100

Internal Hard Stop(s)
111

Multiple Tube Segments 110

External Hard Stop(s)
112

Joint Preloader(s) 120

FIG. 1A

TELESCOPING BOOM SYSTEMS, DEVICES, AND METHODS

CROSS-REFERENCES TO RELATED APPLICATIONS

This application is a non-provisional patent application claiming priority benefit of U.S. provisional patent application Ser. No. 62/874,334, filed on Jul. 15, 2019 and entitled "ZERO DEAD BAND TELESCOPING BOOM SYSTEMS, DEVICES, AND METHODS," the entire disclosure of which is herein incorporated by reference for all purposes.

GOVERNMENT LICENSE RIGHTS

This invention was made with Government support under contract FA9453-17-C-0426 awarded by the United States Air Force. The Government has certain rights in the invention.

BACKGROUND

A variety of tools and techniques have been utilized for the deployment of telescoping booms, such as the use of spring-loaded pins to lock out tube segments or the use of pulley and tensioning systems. In some cases, the system may be tensioned after full deployment.

There may be a need for new tools and techniques for the stowage, deployment, and/or structural support of telescoping boom systems, devices, and/or methods.

SUMMARY

Telescoping boom systems, devices, and methods are provided in accordance with various embodiments. Some embodiments are referred to as zero dead band telescoping boom systems, devices, and methods.

For example, some embodiments include a telescoping boom system that may include multiple tube segments. The multiple tube segments may include at least: a first tube segment that includes one or more external hard stops coupled with the first tube segment; and a second tube segment that includes one or more internal hard stops coupled with the second tube segment. At least a portion of the first tube segment may be stowed interior to the second tube segment. The telescoping boom system may include one or more joint preloaders coupled with at least the first tube segment or the second tube segment such that the one or more joint preloaders apply a force to engage each of the one or more external hard stops of the first tube segment with a respective one of the one or more internal hard stops of the second tube segment to form one or more engaged joints during deployment. In some embodiments, each engaged joint maintains direct contact between one of the external hard stops of the first tube segment and the one of the internal hard stops of the second tube segment during deployment.

In some embodiments of the system, the one or more joint preloaders include one or more latches coupled with the second tube segment such that each latch moves through a respective window from one or more windows formed within the second tube segment to engage the first tube segment. Some embodiments include a third tube segment such that the second tube segment is stowed interior to the third tube segment and the third tube segment includes one or more windows that each include a portion that engages a respective latch from the one or more latches coupled with the second tube segment. In some embodiments, each of the one or more windows of the third tube segment that each include the portion that each engages one of the respective latches from the one or more latches coupled with the second tube segment constrains the respective latch in place until the second tube segment sequentially deploys after the first tube segment deploys and before the third tube segment deploys.

In some embodiments of the system, each latch from the one or more latches coupled with the second tube segment includes one or more rollers. In some embodiments, at least one of the one or more rollers engages the portion of a respective window from the one or more windows of the third tube segment.

In some embodiments of the system, the portion of the respective windows from the one or more windows of the third tube segment include a ramped portion of the respective window. In some embodiments, each latch coupled with the second tube segment is confined between the first tube segment and the ramped portion of the respective window of the third tube segment in a stowed state.

Some embodiments of the system include one or more compliant components configured such that one or more latches coupled with the second tube segment maintains contact with the first tube segment once engaged that facilitates maintaining contact between the external hard stops of the first tube and the respective internal hard stops of the second tube segment during deployment. In some embodiments, the one or more complaint components is integrated as part of the one or more latches coupled with the second tube segment. In some embodiments, the one or more compliant components is coupled with the first tube segment. In some embodiments, the one or more compliant components coupled with the first tube segment include a wave spring.

In some embodiments of the system, the one or more joint preloaders include one or more flexures formed from a portion of the second tube segment, wherein the one or more flexures engage the first tube segment to apply the force to engage each of the one or more external hard stops of the first tube segment with the respective one of the one or more internal hard stops of the second tube segment to form one or more engaged joints during deployment.

In some embodiments of the system, the one or more external hard stops of the first tube segment and the one or more internal hard stops of the second tube segment are segmented such the external hard stops of the first tube segment fit through gaps formed between the internal hard stops of the second tube segment.

Some embodiments of the system include an actuator that engages at least the first tube segment to advance at least the first tube segment. In some embodiments, the actuator includes a lead screw. In some embodiments, the actuator includes at least a piston, a pneumatic actuator, or slit tube boom deployer. In some embodiments, the lead screw disengages from the first tube segment and engages the second tube segment after the one or more joint preloaders apply the force to engage each of the one or more external hard stops of the first tube segment with the respective one of the one or more internal hard stops of the second tube segment to form the one or more engaged joints during deployment. Some embodiments include one or more rails coupled with an exterior surface of the first tube segment such that at least the first tube segment maintains alignment or the one or more rails counteract rotation from the lead screw during deployment.

In some embodiments of the system, each of the one or more latches coupled with the second tube segment include an extended axle through at least one of the rollers from the one or more rollers that constrains respective latch from moving completely through a respective window of the second tube segment towards a center of the second tube segment.

Some embodiments include a method of deployment for a telescoping boom. The method may include: deploying a first tube segment with respect to a second tube segment where at least a portion of the first tube segment is stowed interior to a second tube segment; and/or engaging one or more external hard stops of the first tube segment with one or more internal hard stops of the second tube segment to form one or more engaged joints during deployment. Some embodiments include utilizing one or more joint preloaders coupled with at least the first tube segment or the second tube segment to engage the one or more external hard stops of the first tube segment with the one or more internal hard stops of the second tube segment to form the one or more engaged joints during deployment.

Some embodiments of the method include engaging the one or more external hard stops of the first tube segment with the one or more internal hard stops of the second tube segment to form the one or more joints during deployment maintains direct contact between the one or more external hard stops of the first tube segment and the one or more internal hard stops of the second tube segment as deployment progresses with respect to a third tube segment.

In some embodiments of the method, the one or more joint preloaders coupled with at least the first tube segment or the second tube segment to engage the one or more external hard stops of the first tube segment with the one or more internal hard stops of the second tube segment to form the one or more joints during deployment include one or more latches coupled with the second tube segment such that each latch moves through a respective window from one or more windows formed within the second tube segment to engage the first tube segment. Some embodiments include engaging each latch from the one or more latches coupled with the second tube segment with a portion of a window from one or more windows formed in a third tube segment such that each latch is confined by a surface of the first tube segment and the portion of the respective window prior to engaging the one or more external hard stops of the first tube segment with the one or more internal hard stops of the second tube segment to form the one or more engaged joints. In some embodiments, each of the one or more windows of the third tube segment that each include the portion that each engages one of the respective latches from the one or more latches coupled with the second tube segment constrains the respective latch in place until the second tube segment sequentially deploys after the first tube segment deploys and before the third tube segment deploys. In some embodiments, each latch from the one or more latches coupled with the second tube segment includes one or more rollers. In some embodiments, at least one of the rollers from the one or more rollers engages the portion of the respective window of the third tube segment or one of the rollers from the one or more rollers rolls along a surface of the first tube segment. In some embodiments, the portion of the respective window from the one or more windows of the third tube segment include a ramped portion of the respective window.

Some embodiments of the method include one or more compliant components configured such that one or more latches maintains contact with the first tube segment once engaged that facilitates maintaining contact between the external hard stops of the first tube and the respective internal hard stops of the second tube segment during deployment. In some embodiments, the one or more complaint components is integrated as part of the one or more latches coupled with the second tube segment. In some embodiments, the one or more compliant components is coupled with the first tube segment. In some embodiments, the one or more compliant components coupled with the first tube segment include a wave spring.

In some embodiments of the method, the one or more joint preloaders include one or more flexures formed from a portion of the second tube segment, wherein the one or more flexures engage the first tube segment to apply the force to engage each of the one or more external hard stops of the first tube segment with the respective one of the one or more internal hard stops of the second tube segment to form one or more engaged joints during deployment.

Some embodiments of the method include aligning one or more gaps formed between the one or more external hard stops of the first tube segment with the one or more internal hard stops of the second tube segment to assemble a stowed state.

Some embodiments of the method include deploying the first tube segment utilizing an actuator that engages the first tube segment to advance the first tube segment with respect to the second tube segment. In some embodiments, the actuator includes a lead screw. Some embodiments include disengaging the lead screw the first tube segment and engaging the second tube segment after the one or more joint preloaders apply the force to engage each of the one or more external hard stops of the first tube segment with a respective one of the one or more internal hard stops of the second tube segment to form an engaged joint during deployment. Some embodiments include at least maintaining an alignment of at least the first tube segment or the second tube segment during deployment utilizing one or more rails coupled with at least the first tube segment or the second tube segment or counteracting a rotation of at least the first tube or the second tube segment during deployment utilizing the one or more rails coupled with at least the first tube segment or the second tube segment.

Some embodiments of the method include utilizing a limit switch to stop deployment.

In some embodiments of the method, each of the one or more latches coupled with the second tube segment include an extended axle through at least one of the one or more rollers that constrains respective latch from moving completely through the respective window of the second tube segment towards a center of the second tube segment.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A shows a system in accordance with various embodiments.

DETAILED DESCRIPTION

Figure 1B:
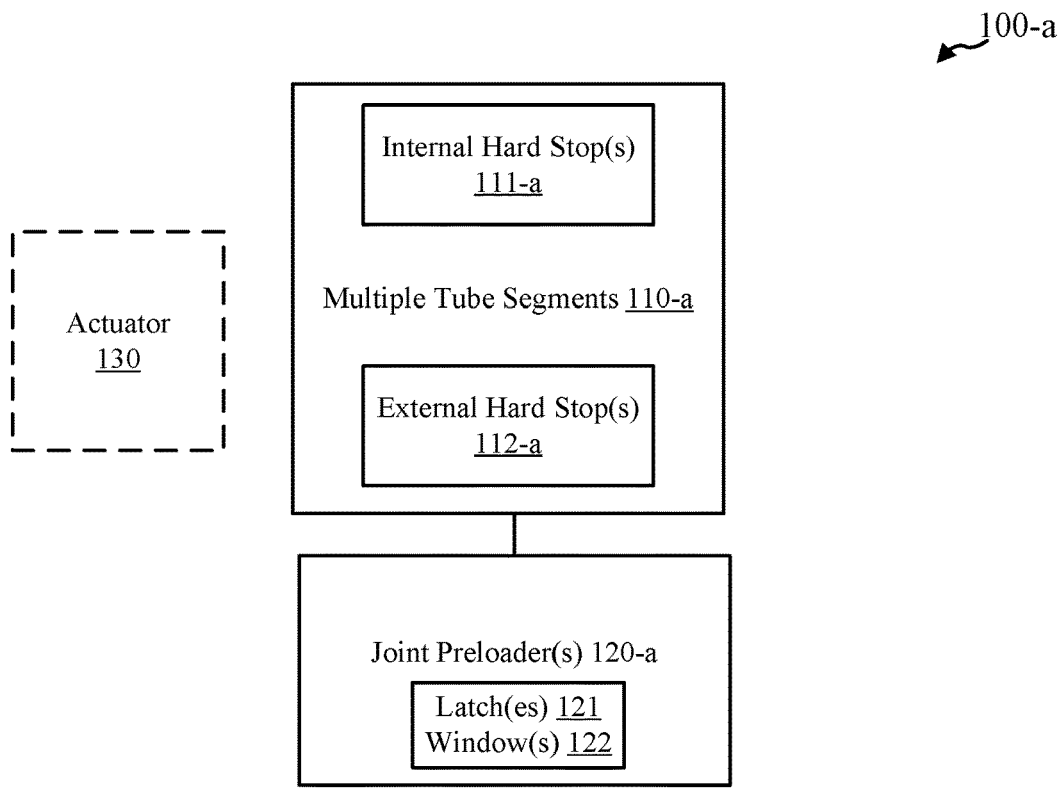
FIG. 1B show a system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Telescoping boom systems, devices, and methods are provided in accordance with various embodiments. For example, some embodiments include zero dead band telescoping boom systems, devices, and methods. Embodiments in general include hard stop preloading mechanisms for telescoping booms with multiple tube segments. Some embodiments provide components that facilitate the deployment sequencing of the multiple tube segments along with facilitating preloading of the multiple tube segments of a telescoping boom, for example. The tools and techniques provided may be integrated into the multiple tube segments rather than being provided as a separate system. Some embodiments allow for precise deployment of the multiple tube segments of the telescoping boom systems, devices, and/or methods. Some embodiments allow for precise repeatable positioning of a tip position of the telescoping boom, such as for precise antenna deployment, through precise deployment of each tube segment with respect to each other. As each tube segment is deployed sequentially, joints between successive tubes may be formed that are preloaded. With joint preload, joints may maintain precision and stiffness. Some embodiments provide preloaded joints with straightforward load paths that may provide various advantages over other tools and techniques. For example, some systems, devices, and methods in accordance with various embodiments provide low CTE structures that may be repeatable from one deployment to the next. Loads paths through one interface from tube segment to tube segment, for example, may provide numerous benefits over other techniques that may utilize more interfaces such as the use of radial pins that may involve more interfaces.

FIG. 1A shows an example of a system 100 in accordance with various embodiments. System 100 in generally may be referred to as a telescoping boom system; for example, system 100 may be a zero dead band telescoping boom system. System 100 may include multiple tube segments 110. One or more of the tube segments 110 may include internal hard stop(s) 111 and external hard stop(s) 112 on opposing ends of each tube segment 110. In some embodiments, at least one of the tube segments 110 only include internal hard stop(s) 111 and/or at least one of the tube segments 110—includes only external hard stops 112. Successive adjacent tube segments 110 may form engaged joint(s) during deployment through contacting respective external hard stop(s) 112 of interior tube segment 110 with internal hard stops 111 of exterior tube segment 110. The hard stops may be preloaded during deployment utilizing a variety of techniques. The structure of system 100 may provide for precise, sequential deployment of the multiple tube segments 110, for example.

Some embodiments utilize one or more joint preloaders 120 configured to apply a force with respect to the external hard stop(s) 112 of interior tube segment 110 and internal hard stop(s) 111 of exterior tube segment 110 as each successive tube segment deploys. The joint preloaders 120 may be configured to facilitate maintaining contact or engagement between the external hard stop(s) 112 of interior tube segment 110 and internal hard stop(s) 111 of exterior tube segment 110 as each successive tube segment deploys.

In some embodiments, the multiple tube segments 110 include at least: a first tube segment 110 that includes one or more external hard stops 112 coupled with the first tube segment 110; and a second tube segment 110 that includes one or more internal hard stops 111 coupled with the second tube segment 110. At least a portion of the first tube segment 110 may be stowed interior to the second tube segment 110. The telescoping boom system 100 may include the one or more joint preloaders 120 coupled with at least the first tube segment 110 or the second tube segment 110 such that the one or more joint preloaders 120 apply a force to engage each of the one or more external hard stops 112 of the first tube segment 110 with a respective one of the one or more internal hard stops 111 of the second tube segment 110 to form one or more engaged joints during deployment. In some embodiments, each engaged joint maintains direct contact between one of the external hard stops 112 of the first tube segment 110 and the one of the internal hard stops 111 of the second tube segment 110 during deployment.

Figure 1C:
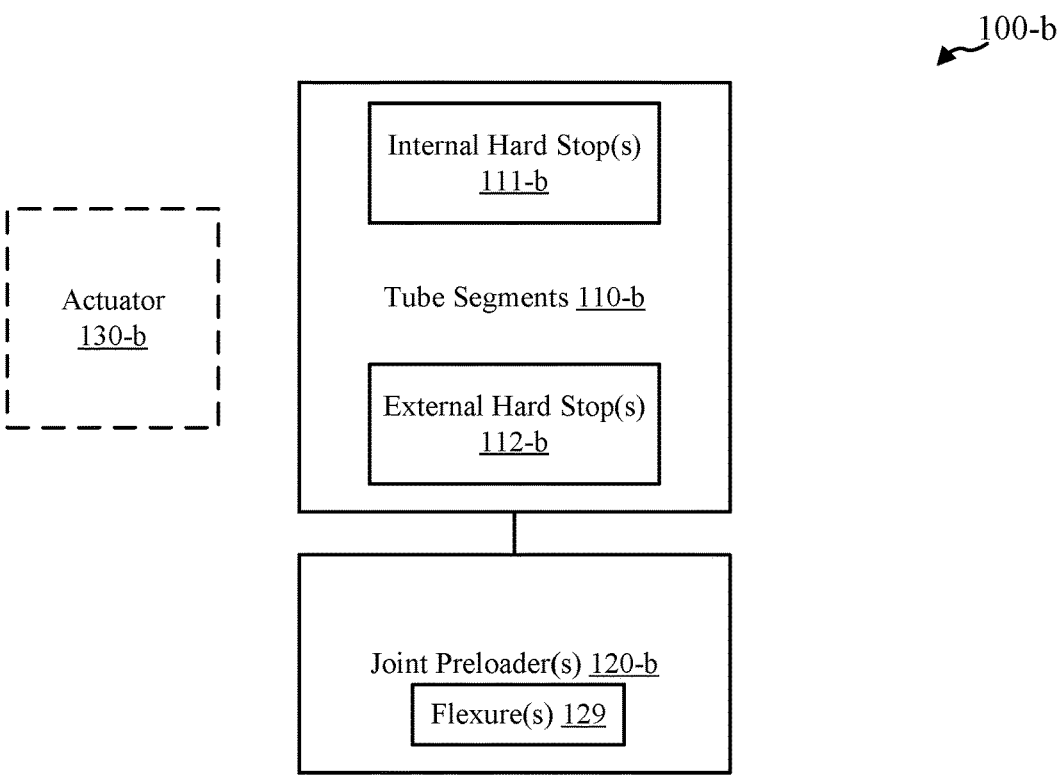
FIG. 1C show a system in accordance with various embodiments.

FIG. 1B and FIG. 1C show examples of system 100-*a* and 100-*b*, respectively, in accordance with various embodiments. These systems 100-*a* and 100-*b* may be examples of system 100 of FIG. 1A. System 100-*a* includes multiple tube segments 110-*a* along with one or more joint preloaders 120-*a* that may include one or more latches 121 and windows 122 For example, latch(es) 121 may be configured to move through window(s) 122 formed in one or more of the tube segments 110-*a* such that latch(es) 121 facilitate applying the force with respect to the external hard stop(s) 112-*a* of an interior tube segment 110-*a* and internal hard stop(s) 111-*a* of an exterior tube segment 110-*a* when the engaged joint forms. System 100-*b* may include multiple tube segments 110-*b* and one or more joint preloaders 120-*b* that may include one or more flexures 129 that may be configured from portion(s) of one or more of the tube segments 110-*b* such that portion(s) of flexure(s) 129 from an exterior tube segment 110-*b* engage a portion of interior tube segment 110-*b* to apply the force with respect to the external hard stop(s) 112-*b* of interior tube segment 110-*b* and internal hard stop(s) 111-*b* of exterior tube segment 110-*b* when the engaged joint forms.

With respect to system 100-*a*, the one or more joint preloaders 120-*a* with the one or more latches 121 and one or more windows 122 may include a variety of features. For example, each window 122 may include a ramped portion at angle other than 90 degrees; for example, the angle may be approximately 45 degrees (other angles may be utilized). In some embodiments, the ramped portion may be utilized to facilitate sequencing the deployment of the tube segments 110-*a* through constraining respective latch(es) 121 in place until a respective tube segment 110-*a* is at its respective stage for deployment. Some embodiments may include windows 122 without ramped portions.

In some embodiments of system 100-*a*, each latch 121 includes one or more rollers; for example, some embodiments include latch(es) 121 with two rollers. In some embodiments, the latch(es) 121 are flexible; some embodiments include latch(es) 121 that are rigid. Some embodiments include latch(es) 121 configured as over-center latch(es).

Some embodiments of system 100-*a* include the hard stops (such as internal hard stops 111-*a* and external hard stops 112-*a*) that are segmented to allow for top down assembly of the multiple tube segments 110-*a*. Some embodiments include torsion rails coupled with one or more of the tube segments 110-*a* that may be aligned with latches 121; the torsion rails may help keep the tube segments 110-*a* from spinning during deployment. The torsion rails may help maintain alignment and/or counteract rotation. The torsion rails may also further facilitate precise deployment.

Some embodiments of system 110-*a* include one or more base components, fittings, or sections coupled with one or more of the tube segments 110-*a* that the latch(es) 121 may engage. Some embodiments include one or more compliant components positioned to facilitate maintain contact between respective external hard stop(s) 112-*a* of interior tube segment 110-*a* with internal hard stops 111-*a* of exterior tube segment 110-*a* as deployed. For example, the compliant component may include one or more wave springs or disc or coil springs. In some embodiments, the latch(es) 121 engage with base portion or fitting of a tube segment 110-*a* when the complaint component is compressed. The compliant component may be compressed through the use of an actuator 130 and its engagement with the base portion or fitting. In some embodiments, the latch(es) 121 themselves may provide the compliance through being flexible.

The use of joint preloader(s) 120-*a*, such with the latch(es) 121 and window(s) 122 configuration may provide both sequencing and structural aspects of the telescoping boom system 100-*a*. For example, during stowage, with respect to each tube segment 110-*a*, each latch 121 of a respective tube segment 110-*a* may engage with window ramp of tube segment 110-*a* exterior to respective tube segment 110-*a*. Each latch 121 may be confined by a tube segment 110-*a* interior to a respective tube segment 110-*a* until the tube segment 110-*a* interior is deployed (in some case, a latch 121 of the interior tube segment 110-*a* may facilitate the confinement); this may facilitate sequencing the deployment of each tube segment 110-*a*. During deployment, internal hard stop(s) 111-*a* of an exterior tube segment 110-*a* generally engages external hard stop(s) 112-*a* of interior tube segment 110-*a*. In the process, latch(es) 121 generally disengage from respective window ramps of tube segment 110-*a* exterior to respective tube segment 110-*a*. Latch(es) 121 generally pivot over to interior tube segment 110-*a* to engage a portion of the interior tube segment 110-*a*, such as a base portion of fitting or other portion of the interior tube segment 110-*a*.

For example, the one or more joint preloaders 120-*a* of system 100-*a* may include the one or more latches 121 coupled with the second tube segment from the multiple tube segments 110-*a* such that each latch 121 moves through a respective window from one or more windows 122 formed within the second tube segment to engage the first tube segment from the multiple tube segments 110-*a*. Some embodiments include a third tube segment from the multiple tube segments 110-*a* such that the second tube segment is stowed interior to the third tube segment and the third tube segment includes one or more windows that each include a portion that engages a respective latch from the one or more latches 121 coupled with the second tube segment from multiple tube segments 110-*a*. In some embodiments, each of the one or more windows 122 of the third tube segment that each include the portion that each engages one of the respective latches from the one or more latches 1211 coupled with the second tube segment constrains the respective latch in place until the second tube segment sequentially deploys after the first tube segment deploys and before the third tube segment deploys.

In some embodiments of system 100-*a*, each latch from the one or more latches 121 coupled with the second tube segment includes one or more rollers. In some embodiments, at least one of the one or more rollers engages the portion of a respective window from the one or more windows of the third tube segment.

In some embodiments of system 100-*a*, the portion of the respective windows from the one or more windows 122 of the third tube segment include a ramped portion of the respective window. In some embodiments, each latch coupled with the second tube segment is confined between the first tube segment and the ramped portion of the respective window of the third tube segment in a stowed state.

Some embodiments of system 100-*a* include one or more compliant components configured such that one or more latches 121 maintain contact with the first tube segment once engaged that facilitates maintaining contact between the external hard stops 112-*a* of the first tube and the respective internal hard stops 111-*a* of the second tube segment during deployment. In some embodiments, the one or more complaint components is integrated as part of the one or more latches 121 coupled with the second tube segment. In some embodiments, the one or more compliant components is coupled with the first tube segment. In some embodiments, the one or more compliant components coupled with the first tube segment include a wave spring.

In some embodiments of system 100-*a*, each of the one or more latches 121 coupled with the second tube segment include an extended axle through at least one of the rollers that constrains respective latch from moving completely through the respective window of the second tube segment towards a center of the second tube segment.

Turning now to system 100-*b*, the one or more joint preloaders 120-*b* may include one or more flexures 129 formed from a portion of a second tube segment from the multiple tube segments 110-*b* where the one or more flexures 129 engage with a first tube segment from the multiple tube segments 110-*b* to apply the force to engage each of the one or more external hard stops 112-*b* of the first tube segment with the respective one of the one or more internal hard stops 111-*b* of the second tube segment to form one or more engaged joints during deployment.

In some embodiments of system 100-*a* and/or system 100-*b*, the one or more external hard stops 112 of the first tube segment and the one or more internal hard stops 111 of the second tube segment are segmented such the external hard stops 112 of the first tube segment fit through gaps formed between the internal hard stops 111 of the second tube segment.

In some embodiments, system 100-*a* may include an actuator 130. Similarly, system 100-*b* may include an actuator 130-*b*. These actuators (130 and/or 130-*b*) may engage at least the first tube segment to advance at least the first tube segment. In some embodiments, the actuator 130 includes a lead screw. In some embodiments, the actuator 130 and/or 130-*b* includes at least a piston, a pneumatic actuator, or slit tube boom deployer. In some embodiments of system 100-*a*, the lead screw disengages from the first tube segment and engages the second tube segment after the one or more joint preloaders 120-*a* apply the force to engage each of the one or more external hard stops 112-*a* of the first tube segment with the respective one of the one or more internal hard stops 111-*a* of the second tube segment to form the one or more engaged joints during deployment. Some embodiments of system 100-*a* and/or 100-*b* include one or more rails coupled with an exterior surface of the first tube segment such that at least the first tube segment maintains alignment or the one or more rails counteract rotation from the lead screw during deployment. Other tube segments from the multiple tube segments 110-*a* may include rails.

Figure 2B:
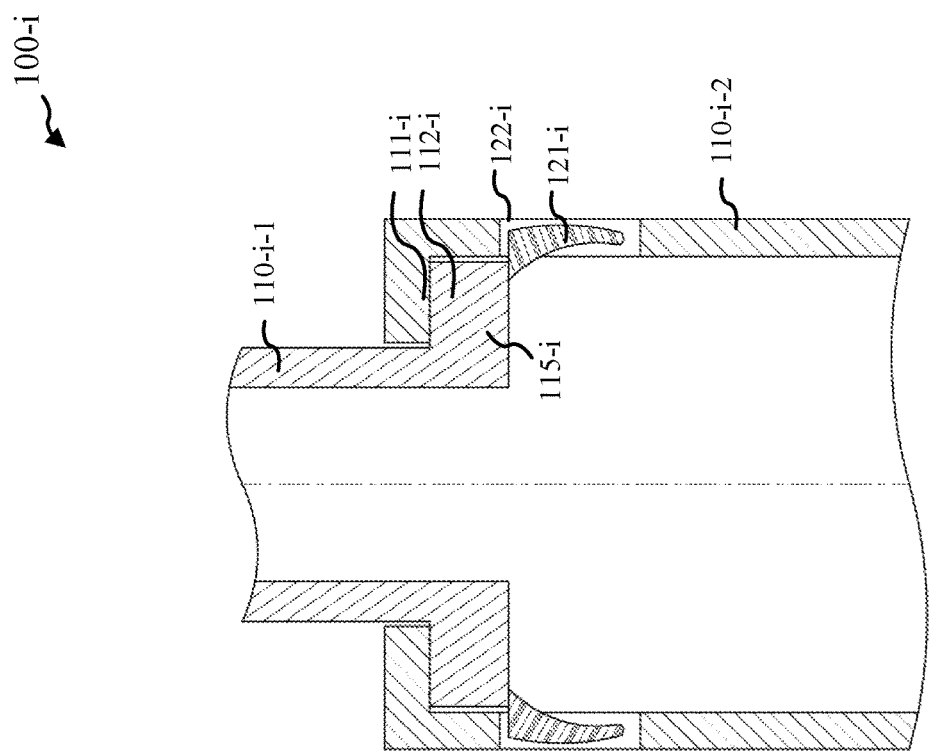
FIG. 2A and FIG. 2B show a deployment sequence of a system in accordance with various embodiments.
Figure 2A:
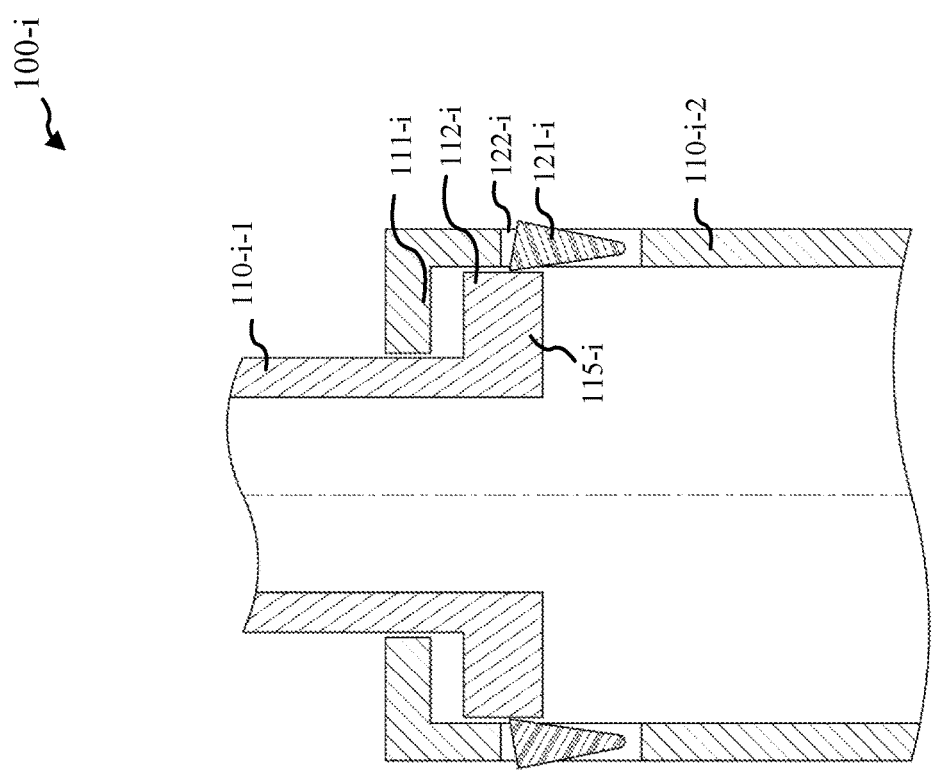

FIG. 2A and FIG. 2B show an example of a joint preload engagement sequence with respect to a simplified system 100-*i* in accordance with various embodiments. System 100-*i* may be an example of aspects of system 100 of FIG. 1A and/or system 100-*a* of FIG. 1B. In particular, system 100-*i* shows two tube segments 110-*i*-1 and 110-*i*-2 with their respective hard stops 111-*i* and 112-*i* going from an unengaged to engaged state contacting each other. One or more latches, such as latch 121-*i*, may facilitate keeping contact between the hard stops 111-*i* and 112-*i*, through compliance provided by the latch.

The engaged joint may be formed through the hard stops 111-*i* and 112-*i* directly engaging or contacting each other. Each joint may be preloaded to maintain a stiffness path. In order to be properly engaged, the external hard stop 112-*i* of tube segment 110-*i*-1 may make contact with the internal hard stop 111-*i* of tube segment 110-*i*-2 without interfering with a preload surface, such as base component 115-*i*. Latch 121-*i* may move with respect to window 122-*i* of tube segment 110-*i*-2 to engage the preload surface. In general, latch 121-*i* is formed as a flexible latch; FIG. 2B shows latch 121-*i* in a flexed state.

FIG. 2A shows in particular a stowed or deploying stage where there is not contact force between external hard stop 112-*i* and internal hard stop 111-*i*. In general, latch 121-*i* provides no load at this stage. In FIG. 2B, a deployed stage may be shown where load may develop with respect to latch 121-*i* Contact pre-load may develop to control kinematics. This may not directly react compression load. A joint stiffness path may form through the following elements: tube segment 110-*i*-1, external hard stop 112-*i*, internal hard stop 111-*i*, and tube segment 110-*i*-2.

One may note that while tube segment 110-*i*-2 may show an internal hard stop 111-*l* near a top portion of the tube segment, tube segment 110-*i*-2 may also be configured with an external hard stop near the bottom portion of the tube segment such that it may form a joint with an additional tube segment that may be configured with an internal hard stop. In general, with a sequence of three or more tube segments, an inner most tube segment may include only external hard stop(s), while an outer most tube segment may only include internal hard stop(s). Intermediary tube segments may include both external hard stops and internal hard stops.

Figure 3:
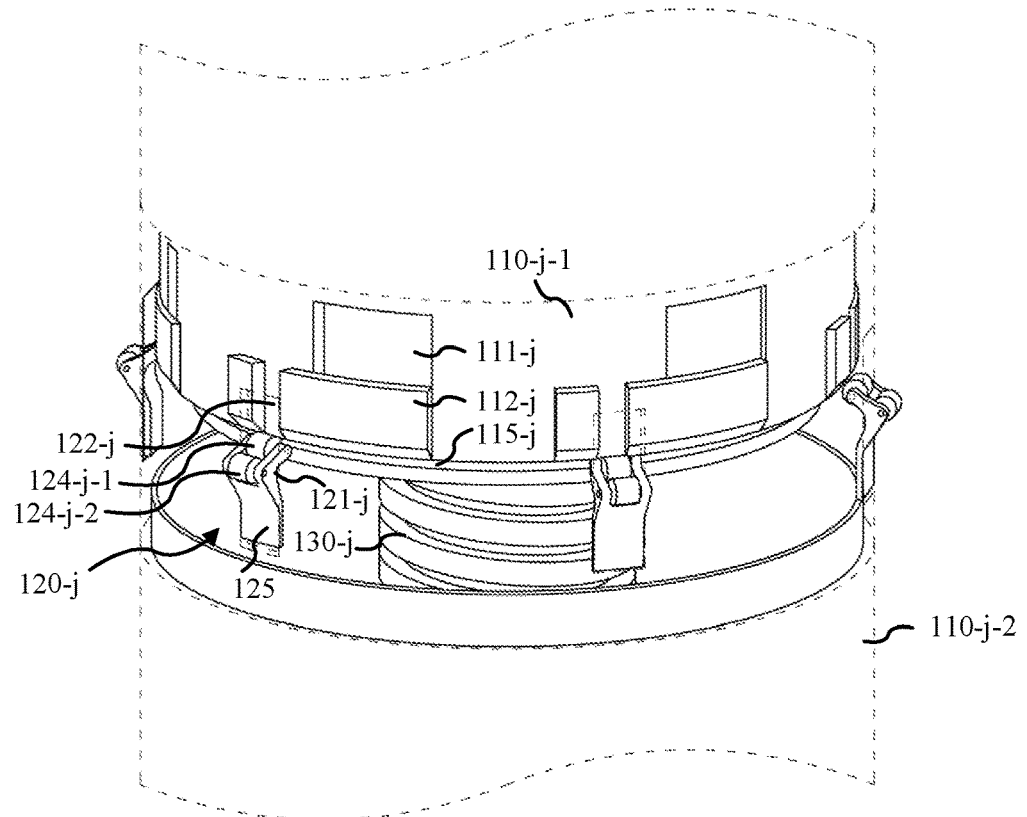
FIG. 3 shows a system in accordance with various embodiments.

FIG. 3 shows aspects of a system 100-*j* in accordance with various embodiments; system 100-*j* may be an example of aspects of system 100 of FIG. 1A, system 100-*a* of FIG. 1B, and/or system 100-*i* of FIG. 2A and/or FIG. 2B.

System 100-*j* may include an outer or exterior tube segment 110-*j*-2 along with multiple latch and window mechanisms as examples of joint preloaders; an exemplary latch and window mechanism 120-*j* is called out, that may include latch 121-*j* and window 122-*j*; The outer surface of tube segment 110-*j*-2 may be shown as transparent in order to see components that may be obscured from view, such as inner or interior tube segment 110-*j*-1. In general, force vectors may seat the latches, such as latch 121-*j*. In some embodiments, a latch seat has a slight locking lip as part of a preload channel 115-*j*, which may be part of a base fitting of tube segment 110-*j*-1. System 100-*j* may show latch 121-*j* as an over-center mechanism; latch 121-*j* may be configured as a flexible latch. Tube segment 110-*j*-2 may include multiple hard stops, such as internal hard stop 111-*j*. Inner or interior tube segment 110-*m*-1 may also include external hard stops, such as hard stop 112-*j*. FIG. 3 shows multiple internal hard stops and multiple external hard stops that are segment, which may facilitate town down assembly. The latches, such as latch 121-*j*, may include one or more rollers (such as rollers 124-*j*-1, 124-*j*-2). A flexible section of the latch arm 125 may be fined tuned for spring rate. Other hard stops, latches, and windows may not be called out. FIG. 3 also shows actuator 130-*j* as a lead screw that may facilitate sequential deployment of each tube segment.

FIG. 4A, FIG. 4B, FIG. 4C, FIG. 4D, and FIG. 4E show a deployment sequence for a system 100-*k* in accordance with various embodiments; system 100-*k* may be an example of system 100 of FIG. 1A, system 100-*a* of FIG.

Figure 4A:
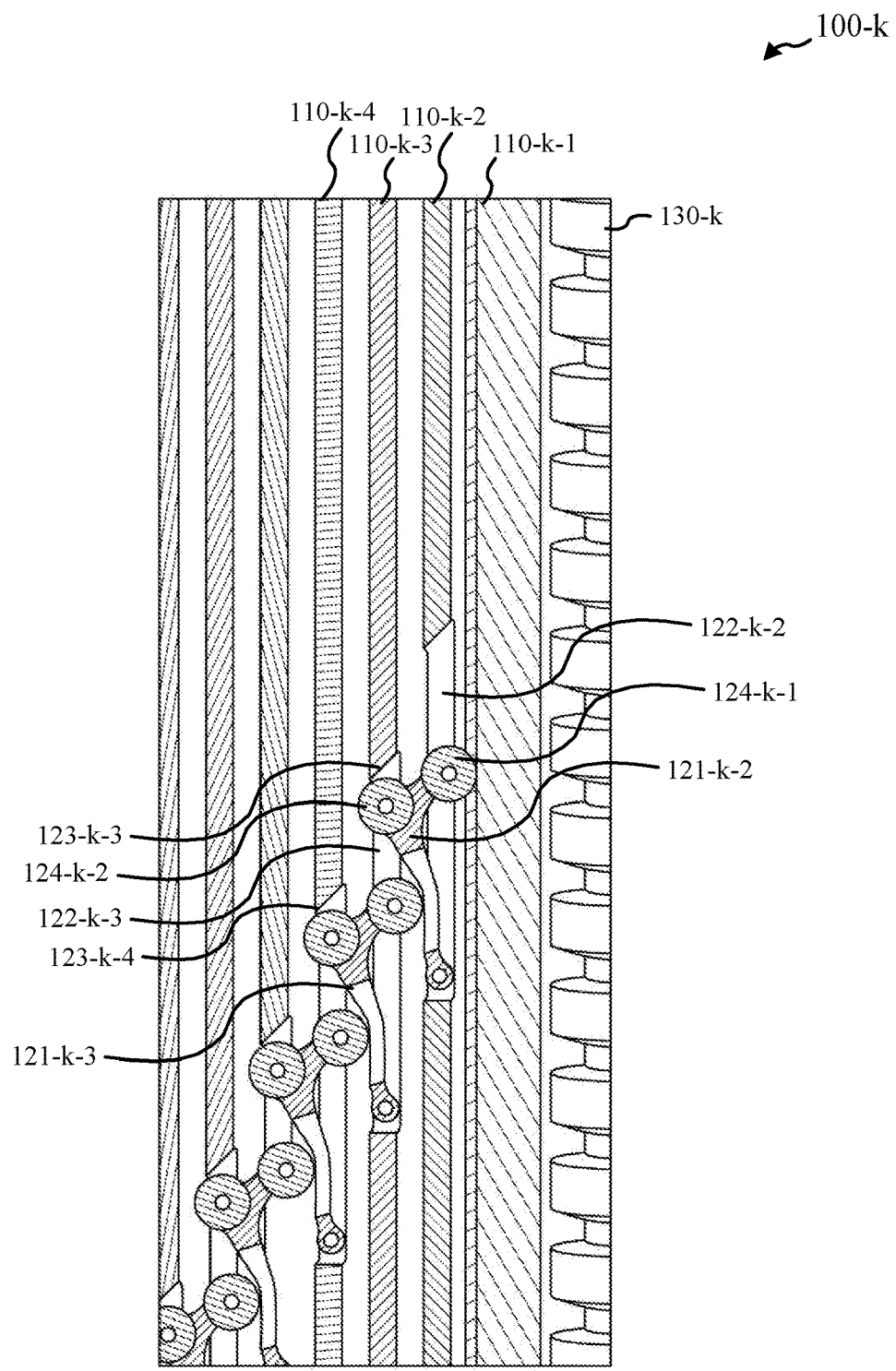
FIG. 4A, FIG. 4B, FIG. 4C, FIG. 4D, and FIG. 4E show a deployment sequence of a system in accordance with various embodiments.
Figure 4B:
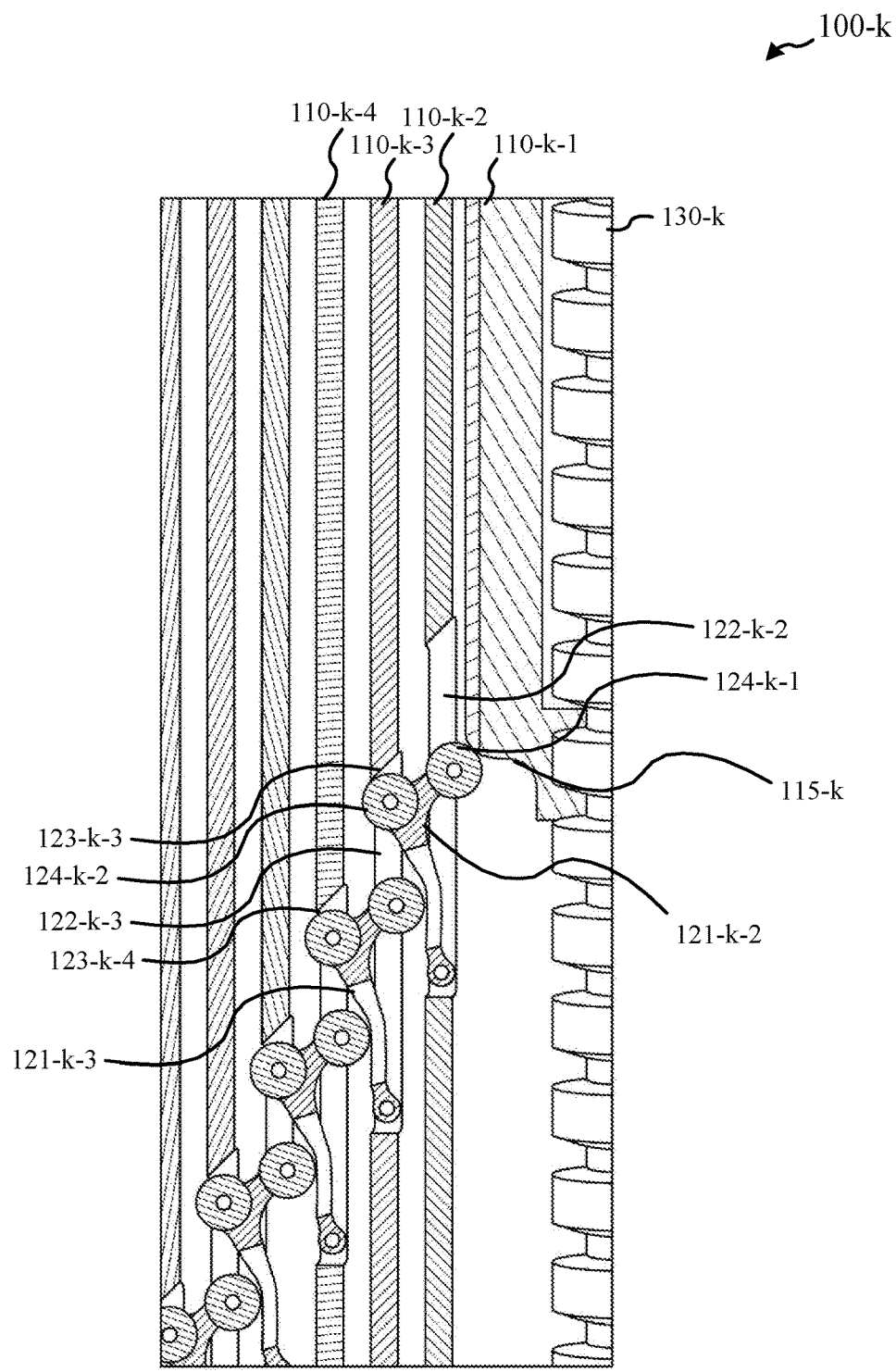
Figure 4C:
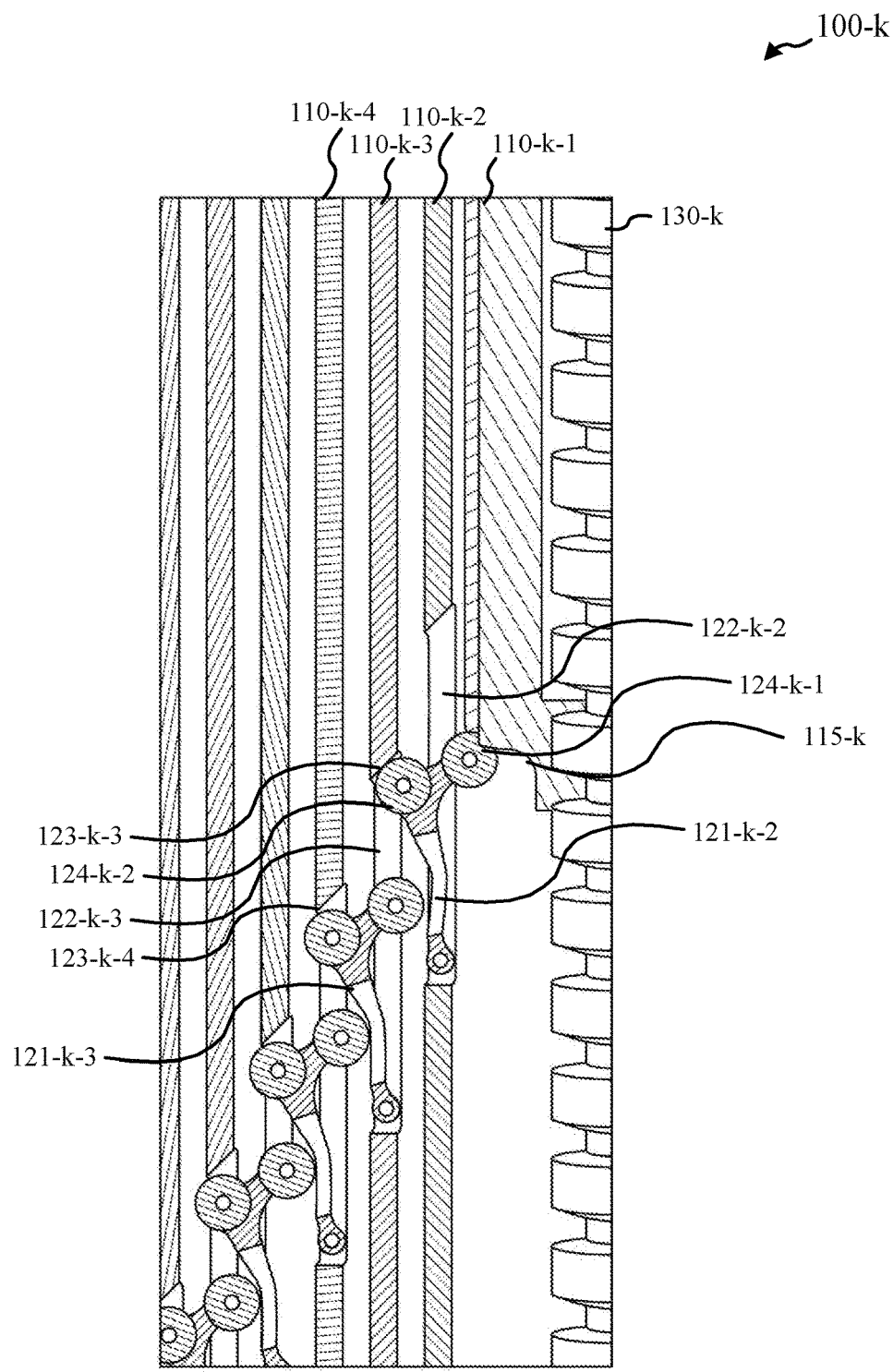
Figure 4D:
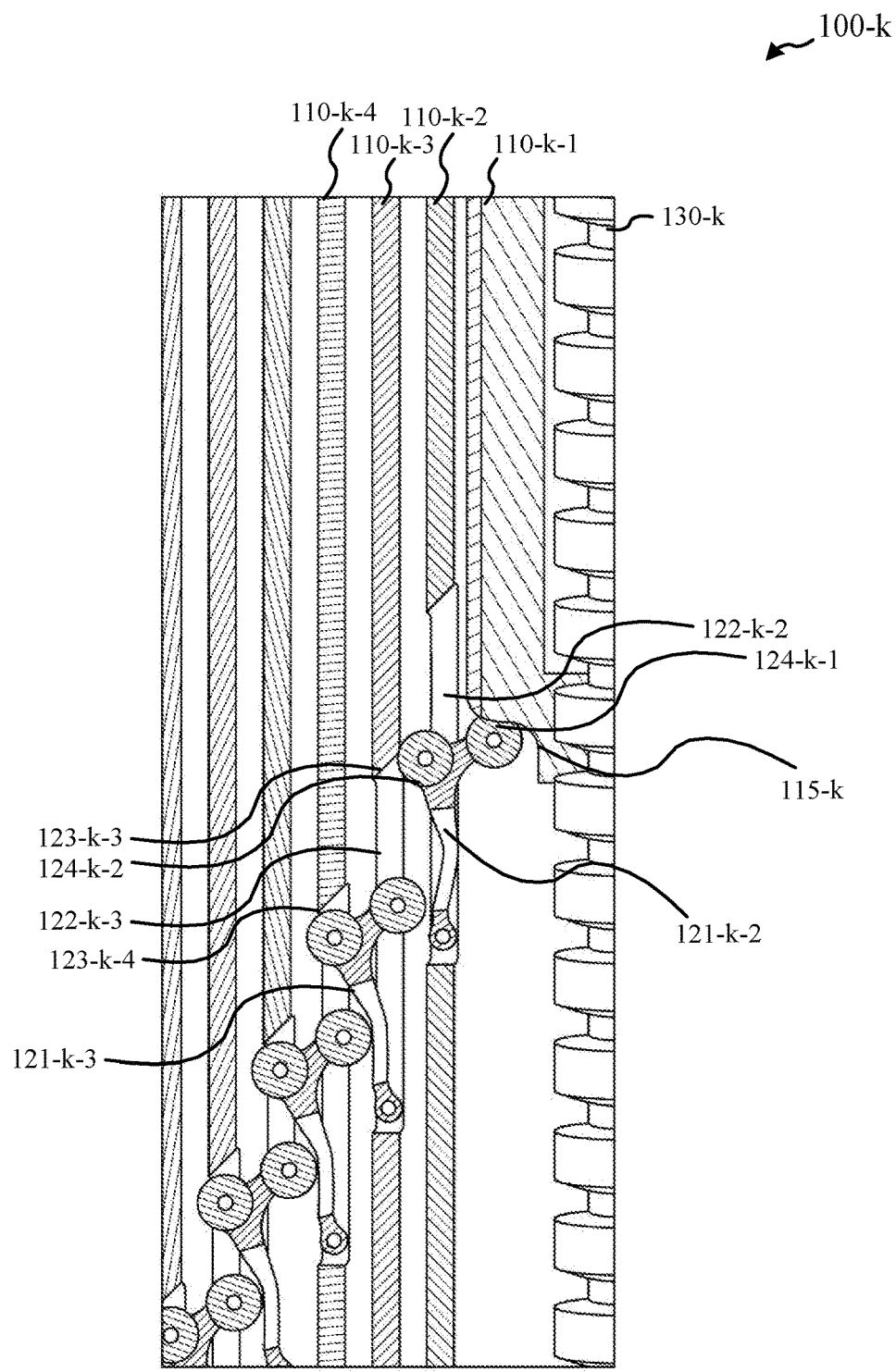
Figure 4E:
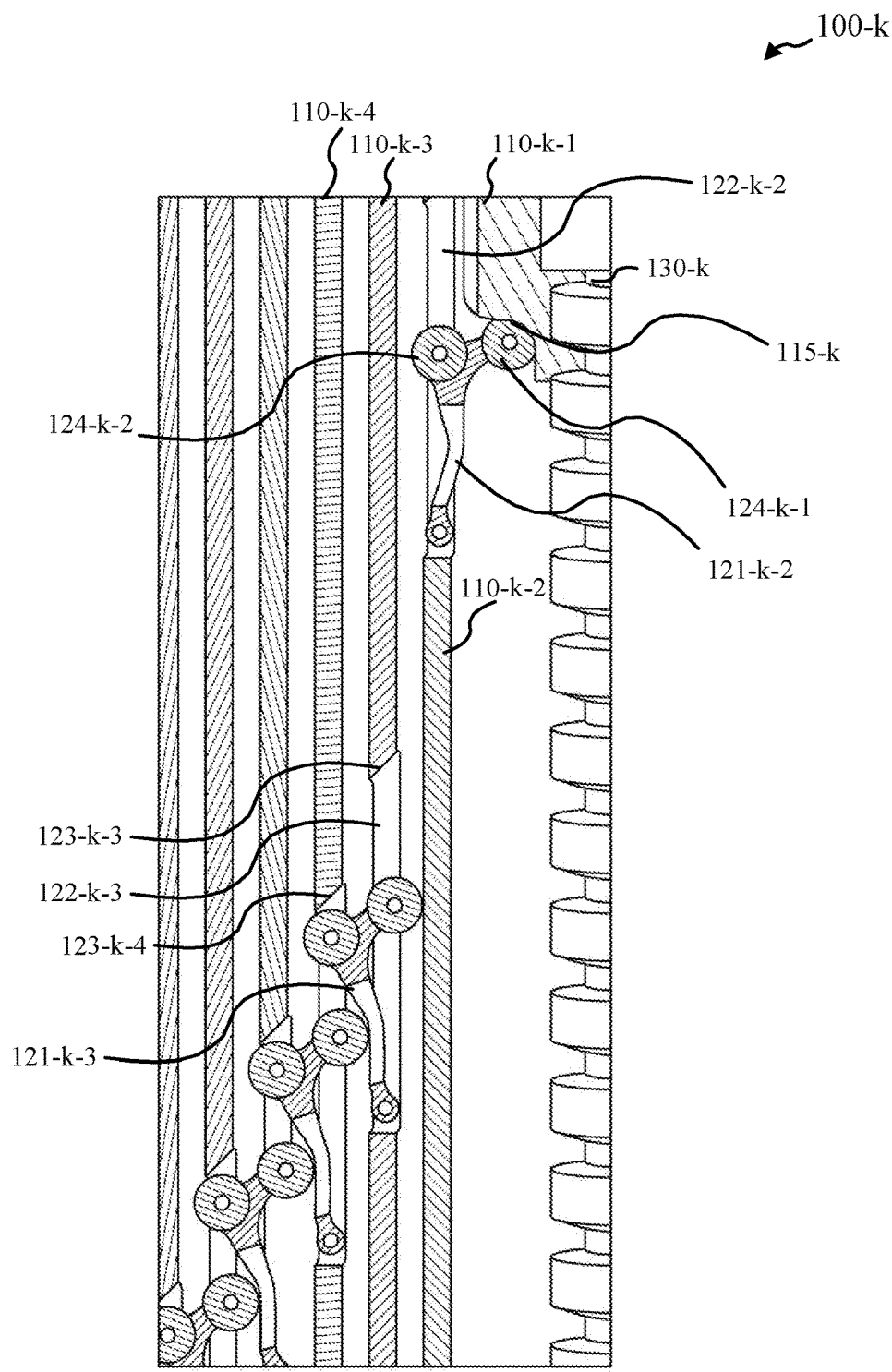

1B, system 100-*i* of FIG. 2A and/or FIG. 2B, and/or system 100-*j* of FIG. 3. Starting with FIG. 4A, a roller latch 121-*k*-2 coupled with tube segment 110-*k*-2 may be shown confined by an external surface of tube segment 110-*k*-1 and window 122-*k*-3 with ramp 123-*k*-3 of tube segment 110-*k*-3. This general configuration of confining respective latches by a portion of a tube segment interior and a portion of a tube exterior to the respective tube segment may facilitate sequentially deploying each tube segment; in some cases, a latch may be confined by an window and/or window ramp of the exterior tube segment and a portion of a latch of an interior tube segment. In FIG. 4B, one or more external hard stop of tube segment 110-*k*-1 may engage one or more internal hard stop of tube segment 110-*k*-2 (out of view; see FIG. 2A, FIG. 2B, and/or FIG. 3 for examples). Tube segment 110-*k*-2 may start moving with tube segment 110-*k*-1. In FIG. 4C, latch 121-*k*-2 of tube segment 110-*k*-2 may ride ramp feature 123-*k*-3; for example, roller 124-*k*-2 may ride the ramp feature 123-*k*-3, while also moving through window 122-*k*-2 formed from tube segment 110-*k*-2 into a preload channel 115-*k* of tube segment 110-*k*-1; preload channel 115-*k* may be part of a base component, section, or fitting of tube segment 110-*k*-1. FIG. 4D may then show tube latch 121-*k*-2 clearing the ramp window 122-*k*-3 and may fully engage the preload channel 115-*k*; roller 124-*k*-1 of latch 121-*k*-2 may engage the preload channel 115-*k*. FIG. 4E may then show tube segment 110-*k*-1 disengaging with the lead screw 130-*k*; tube segment 110-*k*-2 may be driven up by the lead screw 130-*k*. A sequential deployment of each the tube segments may similarly follow from tube segment 110-*j*-2 to 110-*j*-3 to 110-*j*-4, and so on. In general, the latches shown, such as latch 121-*k*-2, may be flexible to provide compliance.

In general, the latch and window mechanisms shown in FIGS. 4A-4E may include an over-center lever mechanism that may engage and sequence each tube segment. The latch and window mechanisms as joint preloaders may also sequence the tube deployment as may be shown in this sequence of figures. The latch and window mechanisms may facilitate preloading hard stops, which may remove dead band as each tube segment is deployed rather than merely providing tension once all the tube segments are deployed.

Merely by way of example, tube segment 110-*k*-1 may approach latching point with tube segment 110-*k*-2, which may be driven by lead screw 130-*k*. Stiffness rings, which may be referred to as the hard stops, may engage to form a stiffness load path (out of view; see FIG. 2A, FIG. 2B, and/or FIG. 3 for example). Latch 121-*k*-2 of tube segment 110-*k*-2 may begin disengaging from tube 110-*k*-3 via window ramp feature 123-*k*-3 and pivot over to tube segment 110-*k*-1, preloading the now moving tube segment 110-*k*-2 to tube segment 110-*k*-1. The lead screw 130-*k* may engage tube segment 110-*k*-2 and disengage tube segment 110-*k*-1. FIG. 4D, for example, may show latch 121-*k*-2 as engaged, while other latches, such as latch 121-*k*-3 may be in a stowed state such that the latch 121-*k*-3 is engaged with the window ramp feature 123-*k*-4 of tube segment 110-*k*-4.

Figure 5B:
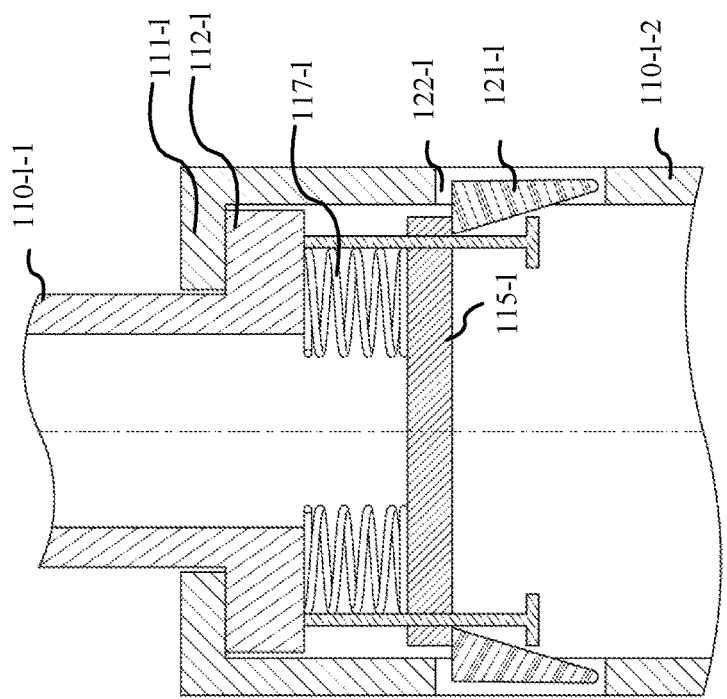
FIG. 5A and FIG. 5B show a deployment sequence of a system in accordance with various embodiments.
Figure 5A:
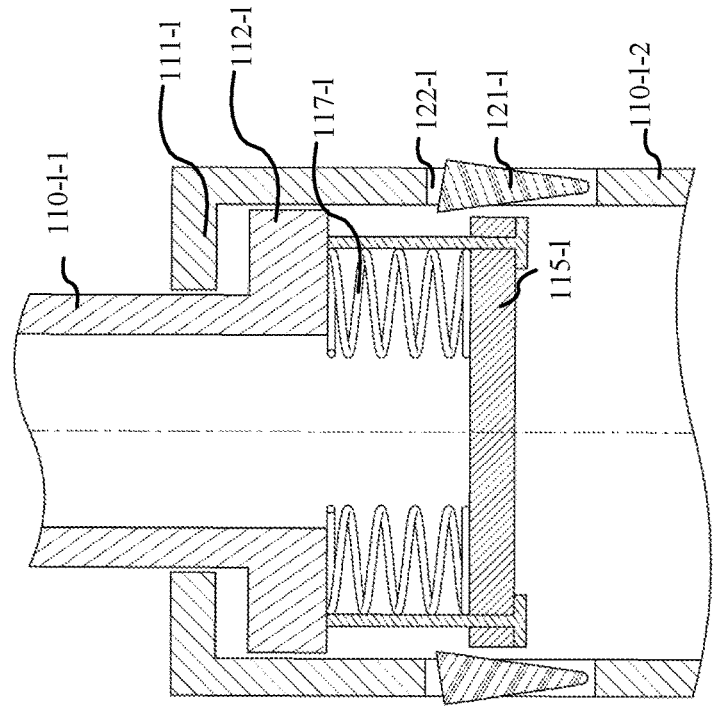

FIG. 5A and FIG. 5B show an example of a joint preload engagement sequence with respect to a simplified system 100-*l* in accordance with various embodiments. System 100-*l* may be an example of aspects of system 100 of FIG. 1A and/or 100-*a* of FIG. 1B. In particular, system 100-*l* shows two tube segments 110-*l*-1 and 110-*l*-2 with their respective hard stops 111-*l* and 112-*l* going from an unengaged to engaged state contacting each other. One or more springs 117-*l* may facilitate keeping contact between the hard stops 111-*l* and 112-*l*.

The engaged joint may be formed through the hard stops 111-*l* and 112-*l* directly engaging or contacting; hard stop 111-*l* may be referred to as an internal hard stop of tube segment 110-*l*-2 and hard stop 112-*l* may be referred to as an external hard stop of tube segment 110-*l*-1. Each joint may be preloaded to maintain a stiffness path. In order to be properly engaged, the external hard stop 112-*l* of tube segment 110-*l*-1 may make contact with the internal hard stop 111-*l* of tube segment 110-*l*-2 without interfering with a preload surface, such as base component 115-*l*. The preload surface may translate into place as may be shown in the sequence of FIG. 5A to FIG. 5B. Latch 121-*l* may move with respect to window 122-*l* of tube segment 110-*l*-2 to engage the preload surface. Latch 121-*l* may be formed as a rigid latch.

FIG. 5A shows in particular a stowed or deploying stage where there is not contact force between external hard stop 112-*l* and internal hard stop 111-*l*. In general, spring 117-*l* may provide low or no spring load at this stage. In FIG. 5B, a deployed stage where spring load may develop with respect to spring 117-*l*. Contact pre-load may develop to control kinematics. This may not directly react a compression load. A joint stiffness path may form through the following elements: tube segment 110-*l*-1, external hard stop 112-*l*, internal hard stop 111-*l*, and tube segment 110-*l*-2. While system 100-*l* may show multiple coiled springs, some embodiments may utilize one or more wave springs.

One may note that while tube segment 110-*l*-2 may show an internal hard stop 111-*l* near a top portion of the tube segment, tube segment 110-*l*-2 may also be configured with an external hard stop near the bottom portion of the tube segment such that it may form a joint with an additional tube segment that may be configured with an internal hard stop. In general, with a sequence of three or more tube segments, an inner most tube segment may include only external hard stop(s), while an outer most tube segment may only include internal hard stop(s). Intermediary tube segments may include both external hard stops and internal hard stops.

Figure 6:
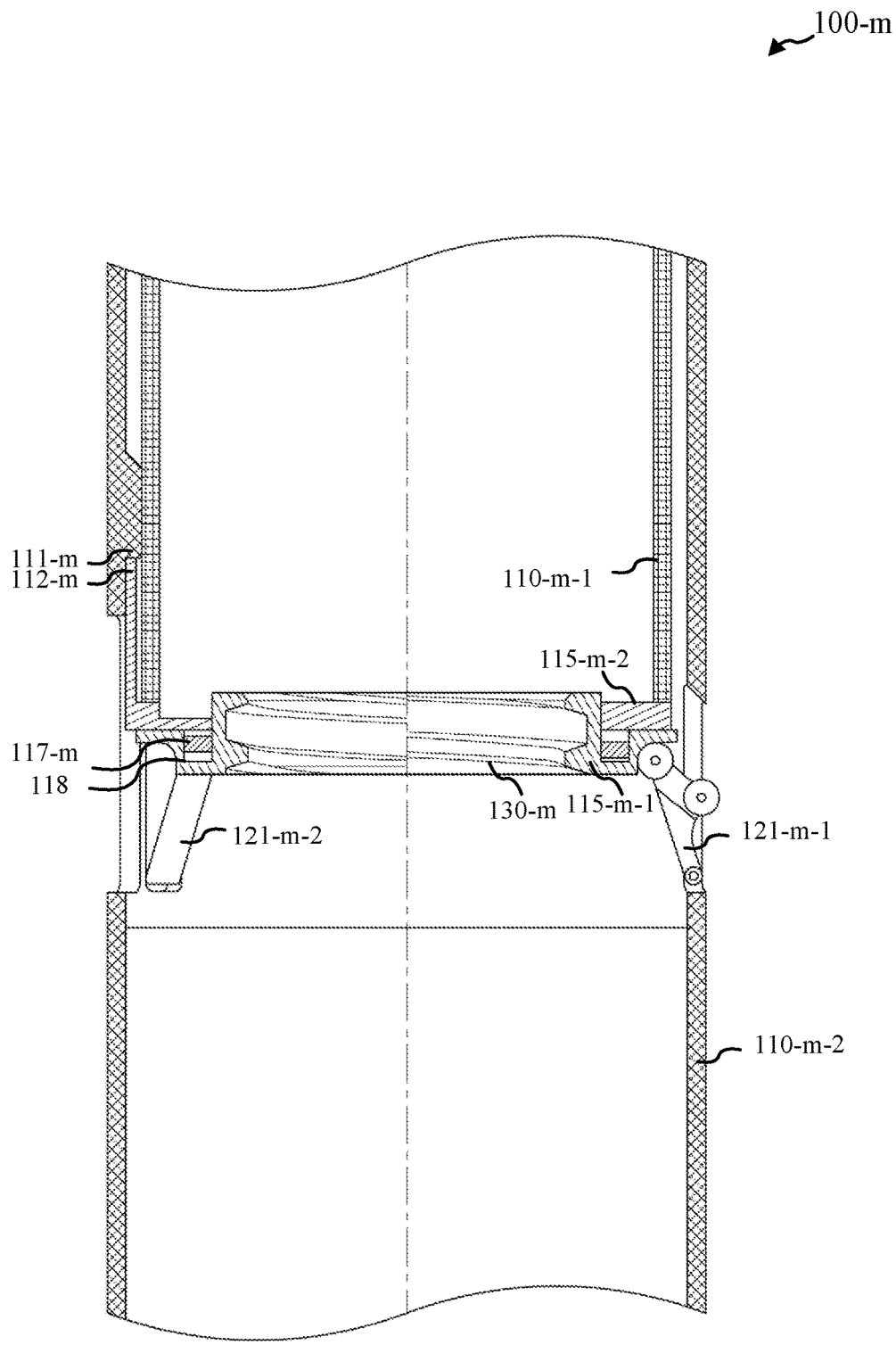
FIG. 6 shows a system in accordance with various embodiments.

Turning now to FIG. 6, two different section or cutaway views of a system 100-*m* in accordance with various embodiments are provided. System 100-*m* may be an example of aspects of system 100 of FIG. 1A, system 100-*a* of FIG. 1B, and/or system 100-*l* of FIG. 5A and/or FIG. 5B. In particular, the views may show different angle section views. For example, the left half of FIG. 6 may show a 0 degree section view that may highlight the hard stop interface between internal hard stop 111-*m* of tube segment 110-*m*-2 and external hard stop 112-*m* of tube segment 110-*m*-1 along with a spring channel 118. The right half of FIG. 6 may show a 15 degree section view with an engaged latch 121-*m*. These angles are merely provided as examples; other placements of components may be utilized.

In system 100-*m*, the latches, such as latch 121-*m*-1 and 121-*m*-2, may be configured to be rigid. In these examples, compliance may be with respect to a compliant component, which may be integrated with a base fitting (such as components 115-*m*-1 and 115-*m*-2) of the interior tube segment (such as tube segment 110-*m*-1) instead of the roller latches 121-*m*. This may make manufacturing and preload validation easier. Some embodiments allow for shimming capabilities. Wave springs and/or disc springs may provide sufficient preload. Tolerance may not be as critical in latch mechanism. FIG. 6 may in particular provide an example where the tube segment 110-*m*-1 forms a tip tube that may include one or more wave springs or washers 117-*m* between the tube segment 110-*m*-1 and the lead screw interface 115-*m*-1 (which may also be referred to as a base component, section, or fitting). The interior or inner tube segment 110-*m*-1 may interface with hard stop 111-*m*-1. Lead screw 130-*m* may drive the base section 115-*m*-1 out, which may compress the wave washers 117-*m*. Once compressed, the latches, such as latches 121-*m*, may engage. For example, with respect to the tube engagement, with the latches 121-*m* from the outer or exterior tube segment 110-*m*-2 may engage with the base section 115-*m*-1 of the inner tube segment 110-*m*-1. The wave spring(s) 117-*m* may be shown compressed. A top portion 115-*m*-2 of the base fitting may be bonded to the respective tube segment, such as tube segment 110-*m*-1. The bottom of the base section 115-*m*-1 may interface with the lead screw 130-*m*, such as through a nut feature as shown. In general, hard stops (such as external hard stop 112-*m* of tube segment 110-*m*-1 and internal hard stop 111-*m* of tube segment 110-*m*-2) may bottom out at full compress of the compression component, such as wave washer 117-*m*. In general, base fittings components 115 for the various tube segments may be include similar mechanisms but may be sized differently. One difference may be found with respect to the tube base fitting, which may not include a roller channel and may result in a smaller base section. While FIG. 6 shows a compliant component configured as a wave spring 117-*m*, other compliant components may be utilized. For example, some configuration may disc spring mechanisms. Snap rings may hold inserts in place. The latch roller's mating curve may be machined into the insert. The disc spring stacks may provide preload when deformed. Compliant material may be included between base sections or fittings.

Figure 7:
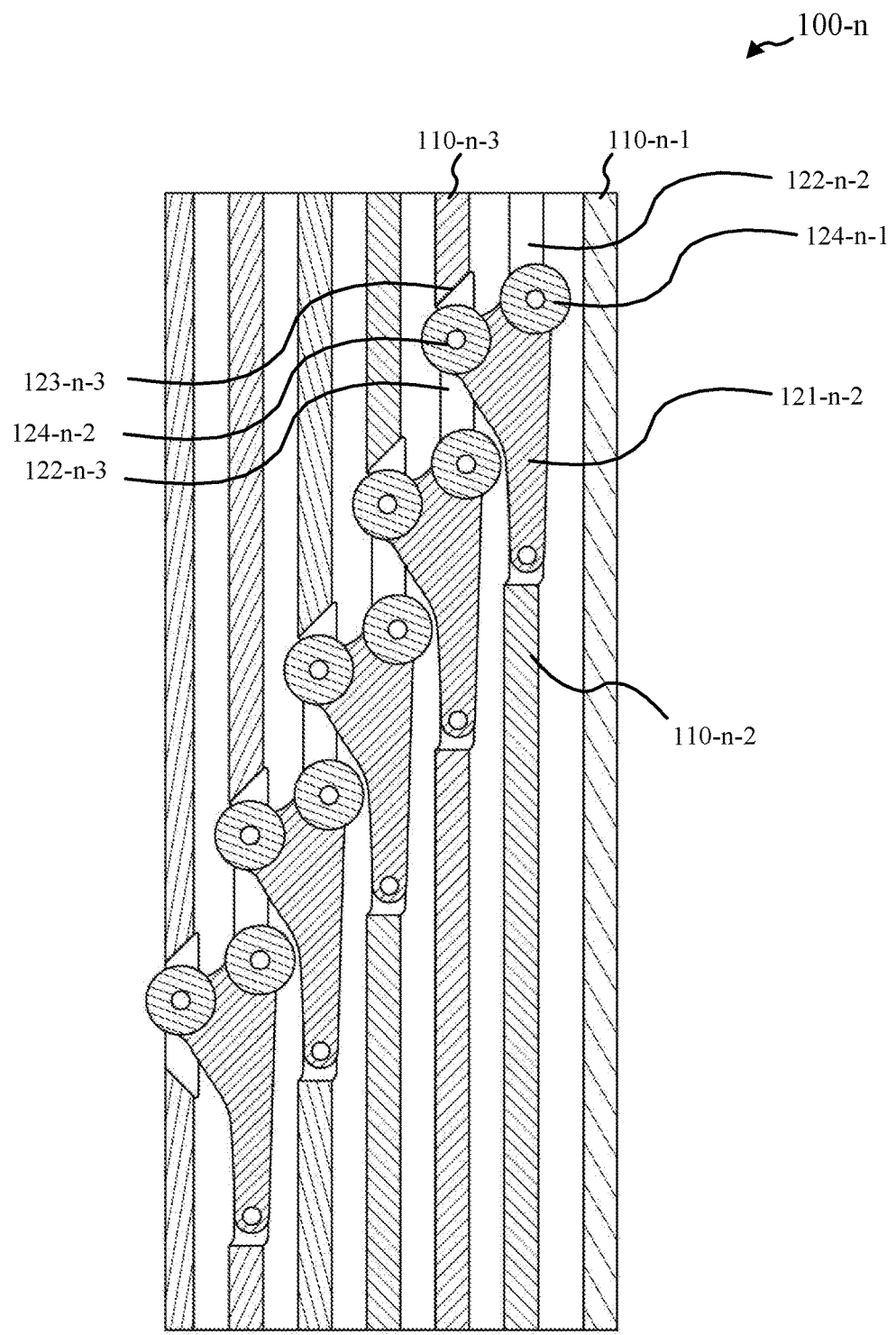
FIG. 7 shows a system in accordance with various embodiments.

FIG. 7 shows aspects of system 100-*n* in a stowed configuration. This may provide an example of aspects of system 100 of FIG. 1A, system 100-*a* of FIG. 1B, system 100-*l* of FIG. 5A and/or FIG. 5B, and/or system 100-*m* of FIG. 6. System 100-*m* may be configured with multiple tube segments with rigid latch mechanisms. In general, the sequence of deployment for this stack of tube segments may be similar to those found with respect to the sequence for FIGS. 4A-4E, but rather than having a flexible or compliant latch, FIG. 7 shows rigid latch structures, where compliance may be found with respect to wave springs or other compliant components as discussed with respect to FIG. 5A, FIG. 5B, and/or FIG. 6.

In general, roller latch 121-*n*-2 coupled with tube segment 110-*n*-2 may be shown confined by an exterior surface of tube segment 110-*n*-1 and window 122-*n*-3 with ramp 123-*n*-3 of tube segment 110-*n*-3. This general configuration of confining respective latches by a portion of a tube segment interior and a portion of a tube exterior to the respective tube segment may facilitate sequentially deploying each tube segment; in some cases, a latch may be confined by an window and/or window ramp of the exterior tube segment and a portion of a latch of an interior tube segment. An external hard stop of tube segment 110-*n*-1 may engage an internal hard stop ring of tube segment 110-*n*-2 (out of view; see FIG. 5A, FIG. 5B, and/or FIG. 6 for examples). Tube segment 110-*n*-2 may start moving with tube segment 110-*n*-1. Latch 121-*n*-2 of tube segment 110-*n*-2 may ride ramp feature 123-*n*-3; for example, roller 124-*n*-2 may ride the ramp feature 123-*n*-3, while also moving through window 122-*n*-2 formed from tube segment 110-*n*-2 into a preload channel (see element 115-*m*-1 of FIG. 6, for example) of tube segment 110-*n*-1; preload channel may be part of a base component of tube segment 110-*n*-1. Tube latch 121-*n*-2 may clear the ramp window 122-*n*-3 and may fully engage the preload channel; roller 124-*n*-1 of latch 121-*n*-2 may engage the preload channel. Tube segment 110-*n*-1 may disengage with a lead screw or other actuator (see FIG. 6, for example); tube segment 110-*n*-2 may be driven up by the lead screw. In general, the latches shown, such as latch 121-*n*-2, may be rigid. Compliance may be provided by other components, such as disc or wave springs (see FIG. 5A, FIG. 5B, and/or FIG. 6, for example).

Figure 8:
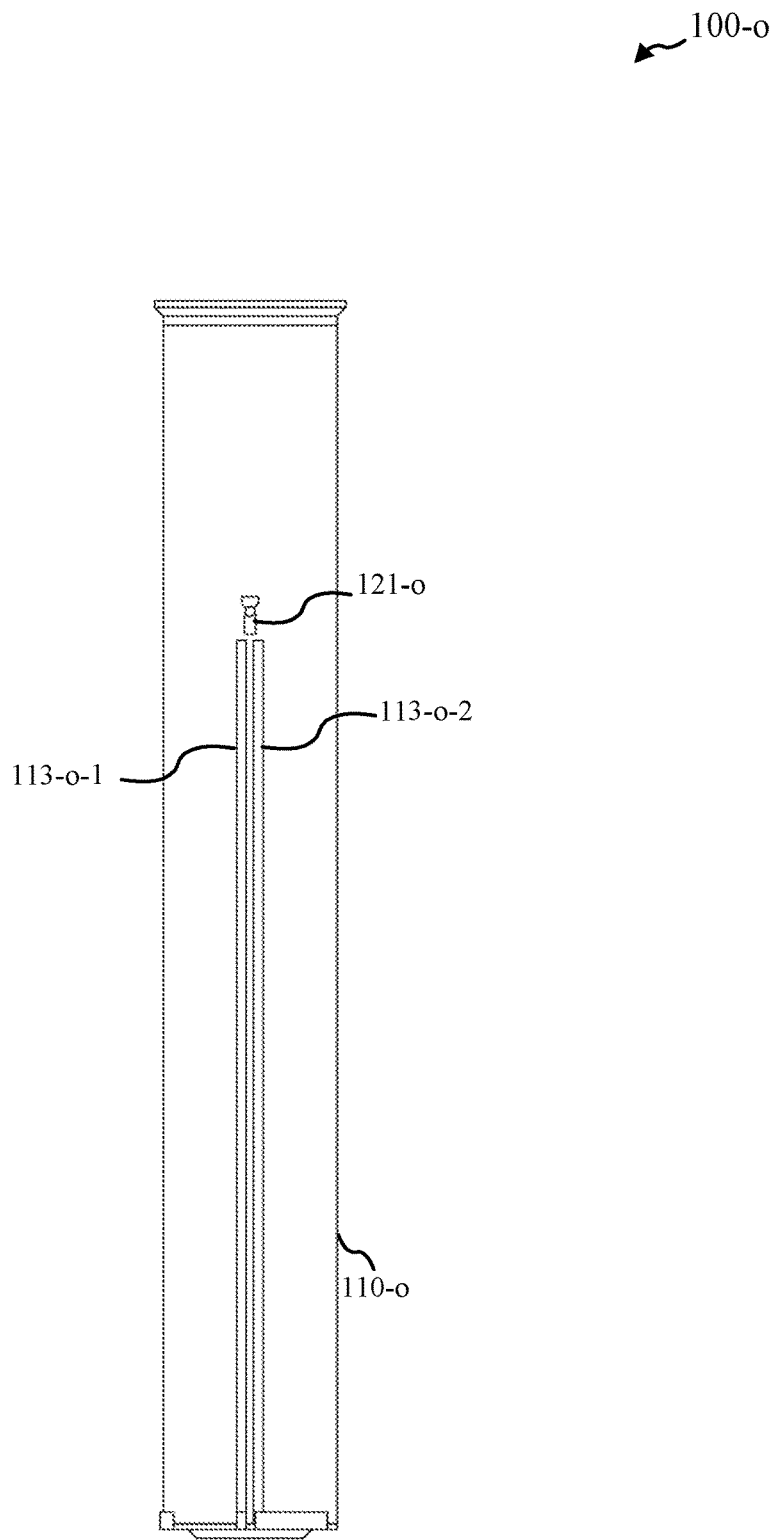
FIG. 8 shows a system in accordance with various embodiments.

Turning now to FIG. 8, various aspects of system 100-*o* are highlighted in accordance with various embodiments. System 100-*o* may be an example of aspects of and/or generally integrated with system 100 of FIG. 1A, system 100-*a* of FIG. 1B, system 100-*i* of FIG. 2A and/or FIG. 2B, system 100-*j* of FIG. 3, system 100-*k* of FIGS. 4A-4E, system 100-*l* of FIG. 5A and/or FIG. 5B, system 100-*m* of FIG. 6, and/or system 100-*n* of FIG. 7. In particular, this figure may show torsion rails 113-*o*-1, 113-*o*-2 that may be bonded to the tube segments, such as tube segment 110-*o*. The rails 113-*o*-1, 113-*o*-2 may be aligned with the placement of the latch(es), such as latches 121-*o* that may form part of a joint preloader; some embodiments may align the rails 113-*o*-1, 113-*o*-2 with other components instead of the latches. The rails 113-*o*-1, 113-*o*-2 may be coupled with an exterior surface of one or more of the tube segments, such as tube segment 110-*o*, such that at least the tube segment maintains alignment or the one or more rails counteract rotation from a lead screw, for example, during deployment. The rails 113-*o*-1, 113-*o*-2 may also facilitate more precision and/or repeatability with deployment.

Figure 9:
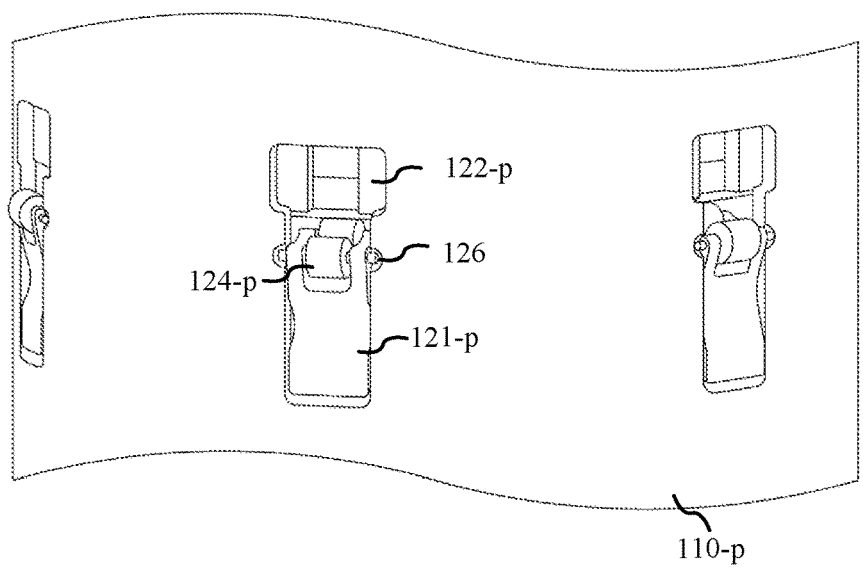
FIG. 9 shows a system in accordance with various embodiments.

Turning now to FIG. 9, various aspects of system 100-*p* are highlighted in accordance with various embodiments. In particular, system 100-*p* may highlight the use of a latch constraint in accordance with various embodiments. System 100-*p* may be an example of aspects of and/or generally integrated with system 100 of FIG. 1A, system 100-*a* of FIG. 1B, system 100-*i* of FIG. 2A and/or FIG. 2B, system 100-*j* of FIG. 3, system 100-*k* of FIGS. 4A-4E, system 100-*l* of FIG. 5A and/or FIG. 5B, system 100-*m* of FIG. 6, system 100-*n* of FIG. 7, and/or system 100-*o* of FIG. 8. To keep a latch, such as latch 121-*p*, from rotating too far and falling into the center cavity of the assembly (completely through tube segment 110-*p*), a slightly longer or extended axle 126 on the back roller 124-*p* of each latch assembly may be utilized; the extended axle extended through roller 124-*p* may constrain the latch 121-*p* from moving completely through the window 122-*p* towards a center of the tube segment 110-*p*. The longer axle 126 may not clear the fitting in which it is mounted to fall through. In some embodiments, a widened ramp-window 122-*p* may allow for smooth movement and may relieve latch width tolerance. The widened access hole 122-*p* may allow the roller to seat without interference. The longer axle 126 may have enough clearance to not make contact once engaged.

Figure 10A:
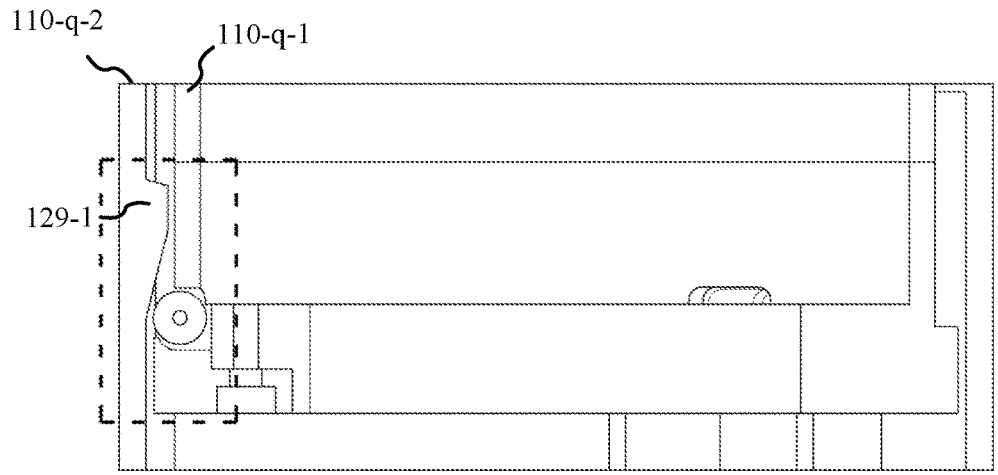
FIG. 10A, FIG. 10B, and FIG. 10C show different aspects of a system in accordance with various embodiments.
Figure 10B:
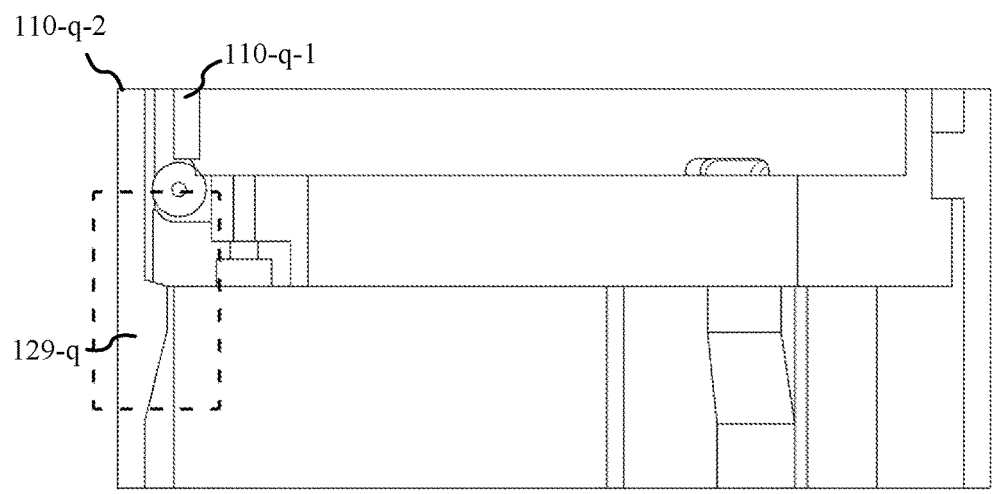
Figure 10C:
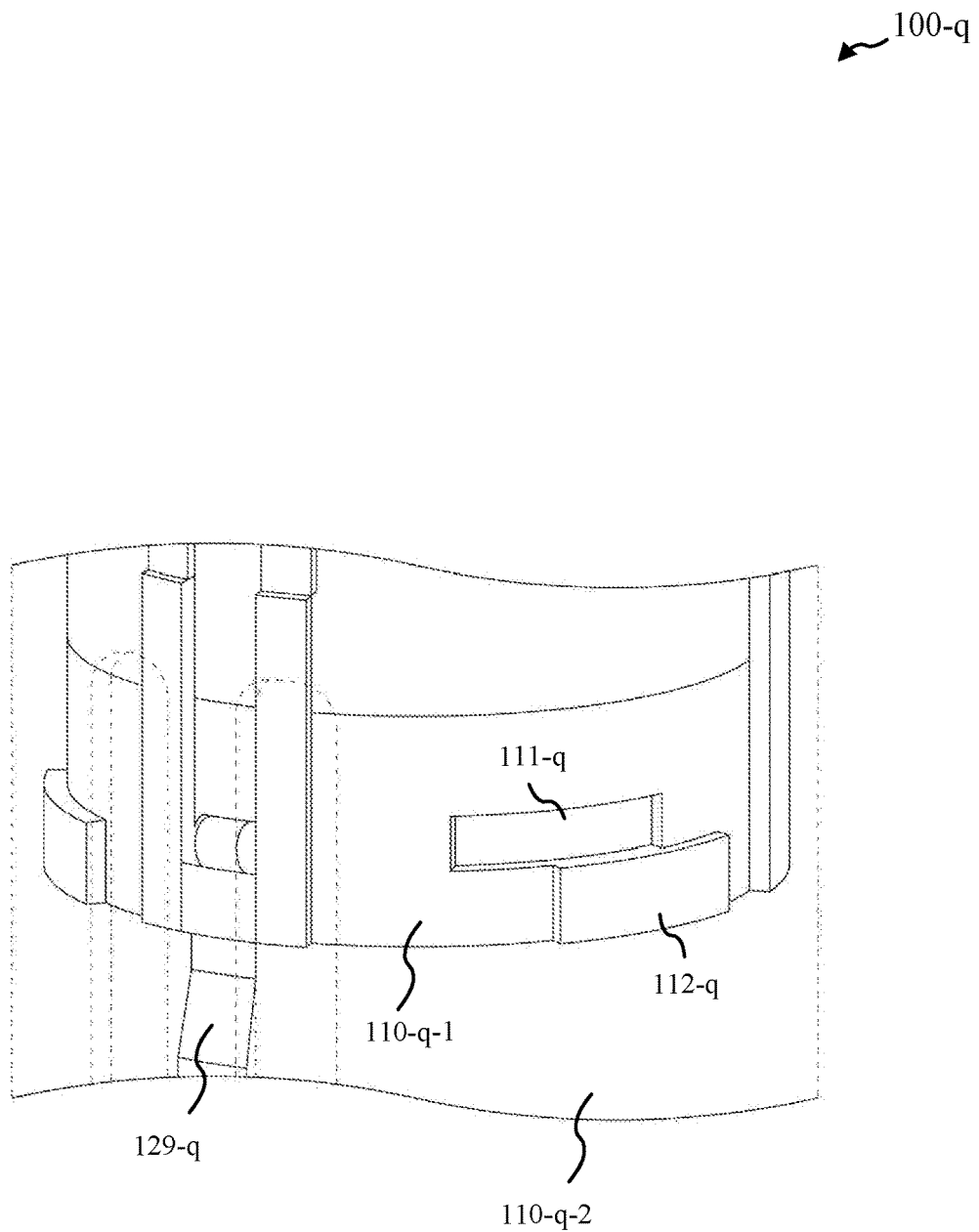

Turning now to FIG. 10A, FIG. 10B, and FIG. 10C, different aspects of a system 100-*q* are provided in accordance with various embodiments. System 100-*q* may be an example of system 100 of FIG. 1A and/or system 100-*b* of FIG. 1C. In particular, these figures generally show the use of a flexure joint design with respect to a joint preloader. In general, these embodiments may involve less force to engage for the deployment of multiple tube segments, but much higher force to disengage.

FIG. 10A shows the deployment interface highlighted, which may utilize a 75 degree rolling interface of a flexure 129-*q*, which may be formed as part of tube segment 110-*q*-2; other rolling interface angles may be utilized. FIG. 10B may show the deployed interface highlighted, which may utilize a steep cup-cone interface. The interference fit on insert may maintain preloads on hard stops. The use of hard stops may be further emphasized in FIG. 10C. Flexure 129-*q* may provide preload from base during deployment. Hard stops, such as internal hard stop 111-*q* (coupled with tube segment 110-*q*-2) and external hard stop 112-*q* (coupled with tube segment 110-*q*-1) along wide panels of flexure fitting may provide stiffness. In general, the hard stops are broken up for top-down assembly of the system. This configuration generally drives high stiffness through the joints; the flexure 129-*q* may include preload wedge as part of tube segment 110-*q*-2. In general, the flexure bears the full axial load, which can drive stiffness down in joints.

Figure 11:
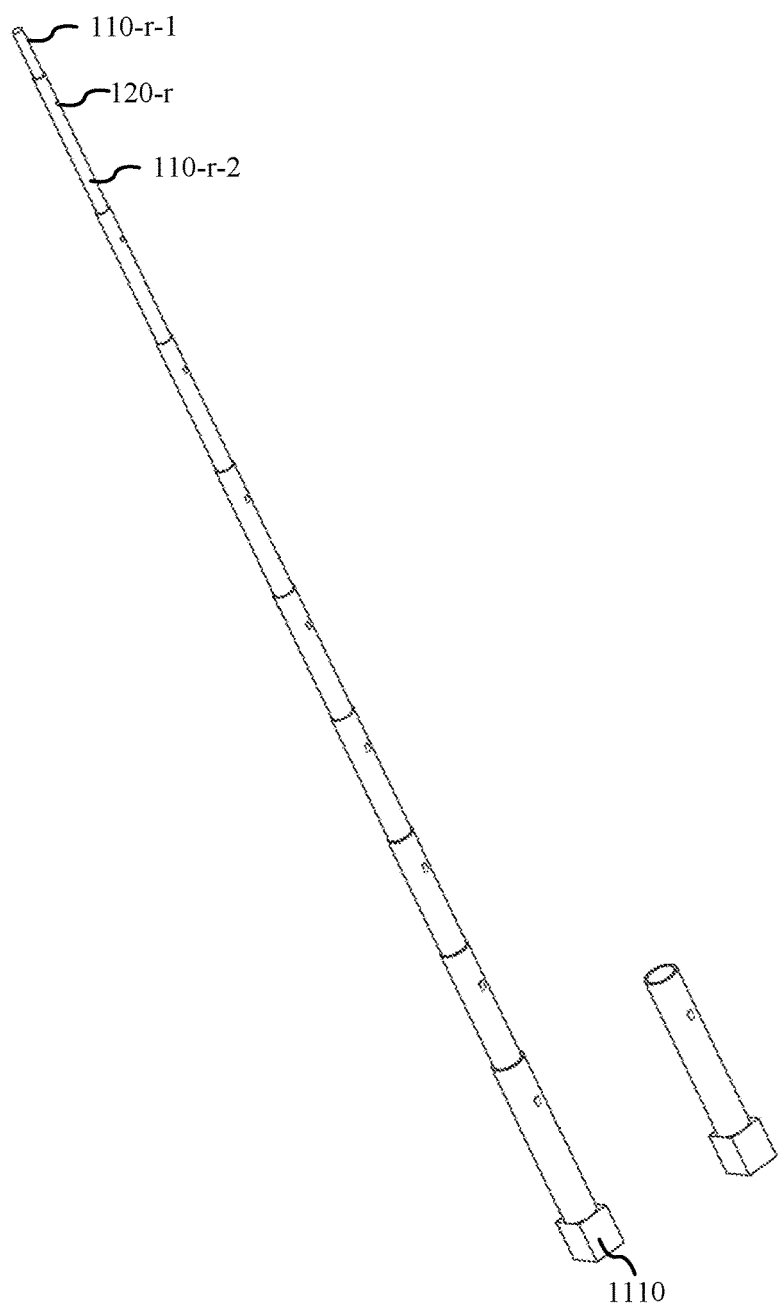
FIG. 11 shows a stowed and deployed configured of a system in accordance with various embodiments.

FIG. 11 shows a stowed (right image) and deployed state (left image) of a telescoping boom system 100-*r* in accordance with various embodiments. In the deployed state, multiple tube segments and portions of joint preloaders may be shown; in particular, tube segments 110-*r*-1 and 110-*r*-2 are called out, along with joint preloader 120-*r*; joint preloader 120-*r* may be configured utilizing a latch and window configuration or a flexure configuration and discussed above. System 100-*r* may also include a base 1110, which may provide support for the telescoping boom and/or contain additional components, such as motors to drive an actuator and/or house electrical components of the system. System 100-*r* may be an example of aspects of system 100 of FIG. 1A, system 100-*a* of FIG. 1B, system 100-*b* of FIG. 1C, system 100-*i* of FIGS. 2A-2B, system 100-*j* of FIG. 3, system 100-*k* of FIGS. 4A-4E, system 100-*l* of FIGS. 5A-5B, system 100-*mf* of FIG. 6, system 100-*n* of FIG. 7, system 100-*o* FIG. 8, system 100-*p* FIG. 9, and/or system 100-*q* of FIGS. 10A-10C.

Figure 12:
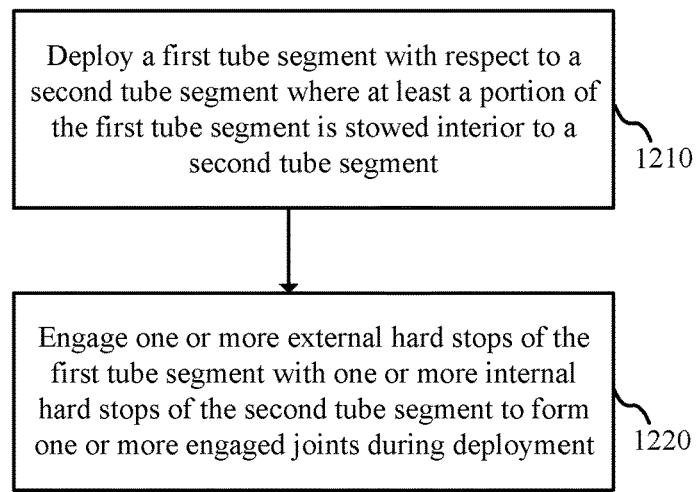
FIG. 12 shows a flow diagram of a method in accordance with various embodiments.

Turning now to FIG. 12, a flow diagram of a method 1200 is shown in accordance with various embodiments. Method 1200 may provide a method of deployment for a telescoping boom. Method 1200 may be referred to as a method of deployment for a zero dead band telescoping boom. Method 1200 may be implemented utilizing a variety of systems and/or devices such as those shown and/or described with respect to FIG. 1A, FIG. 1B, FIG. 1C, FIG. 2A, FIG. 2B, FIG. 3, FIG. 4A, FIG. 4B, FIG. 4C, FIG. 4D, FIG. 4E, FIG. 5A, FIG. 5B, FIG. 6, FIG. 7, FIG. 8, FIG. 9, FIG. 10A, FIG. 10B, FIG. 10C, and/or FIG. 11.

At block 1210, a first tube segment may be deployed with respect to a second tube segment where at least a portion of the first tube segment is stowed interior to a second tube segment. At block 1220, one or more external hard stops of the first tube segment may engage with one or more internal hard stops of the second tube segment to form one or more engaged joints during deployment. Some embodiments include utilizing one or more joint preloaders coupled with at least the first tube segment or the second tube segment to engage the one or more external hard stops of the first tube segment with the one or more internal hard stops of the second tube segment to form the one or more engaged joints during deployment.

Some embodiments of the method 1200 include engaging the one or more external hard stops of the first tube segment with the one or more internal hard stops of the second tube segment to form the one or more joints during deployment maintains direct contact between the one or more external hard stops of the first tube segment and the one or more internal hard stops of the second tube segment as deployment progresses with respect to a third tube segment.

In some embodiments of the method 1200, the one or more joint preloaders coupled with at least the first tube segment or the second tube segment to engage the one or more external hard stops of the first tube segment with the one or more internal hard stops of the second tube segment to form the one or more joints during deployment include one or more latches coupled with the second tube segment such that each latch moves through a respective window from one or more windows formed within the second tube segment to engage the first tube segment. Some embodiments include engaging each latch from the one or more latches coupled with the second tube segment with a portion of a window from one or more windows formed in a third tube segment such that each latch is confined by a surface of the first tube segment and the portion of the respective window of the third tube segment prior to engaging the one or more external hard stops of the first tube segment with the one or more internal hard stops of the second tube segment to form the one or more engaged joints. In some embodiments, each of the one or more windows of the third tube segment that each include the portion that each engages one of the respective latches from the one or more latches coupled with the second tube segment constrains the respective latch in place until the second tube segment sequentially deploys after the first tube segment deploys and before the third tube segment deploys. In some embodiments, each latch from the one or more latches coupled with the second tube segment includes one or more rollers. In some embodiments, at least one of the rollers from the one or more rollers engages the portion of the respective window of the third tube segment or one of the rollers from the one or more rollers rolls along a surface of the first tube segment. In some embodiments, the portion of the respective window from the one or more windows of the third tube segment include a ramped portion of the respective window.

Some embodiments of the method 1200 include one or more compliant components configured such that one or more latches maintains contact with the first tube segment once engaged that facilitates maintaining contact between the external hard stops of the first tube and the respective internal hard stops of the second tube segment during deployment. In some embodiments, the one or more complaint components is integrated as part of the one or more latches coupled with the second tube segment. In some embodiments, the one or more compliant components is coupled with the first tube segment. In some embodiments, the one or more compliant components coupled with the first tube segment include a wave spring.

In some embodiments of the method 1200, the one or more joint preloaders include one or more flexures formed from a portion of the second tube segment, wherein the one or more flexures engage the first tube segment to apply the force to engage each of the one or more external hard stops of the first tube segment with the respective one of the one or more internal hard stops of the second tube segment to form one or more engaged joints during deployment.

Some embodiments of the method include aligning one or more gaps formed between the one or more external hard stops of the first tube segment with the one or more internal hard stops of the second tube segment to assemble a stowed state.

Some embodiments of method 1200 include deploying the first tube segment utilizing an actuator that engages the first tube segment to advance the first tube segment with respect to the second tube segment. In some embodiments, the actuator includes a lead screw. Some embodiments include disengaging the lead screw the first tube segment and engaging the second tube segment after the one or more joint preloaders apply the force to engage each of the one or more external hard stops of the first tube segment with a respective one of the one or more internal hard stops of the second tube segment to form an engaged joint during deployment. Some embodiments include at least maintaining an alignment of at least the first tube segment or the second tube segment during deployment utilizing one or more rails coupled with at least the first tube segment or the second tube segment or counteracting a rotation of at least the first tube or the second tube segment during deployment utilizing the one or more rails coupled with at least the first tube segment or the second tube segment. Some embodiments of the method 1200 include utilizing a limit switch to stop deployment.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A telescoping boom system comprising
a plurality of tube segments, wherein the plurality of tube segments includes at least:
a first tube segment that includes one or more external hard stops coupled with the first tube segment; and
a second tube segment that includes one or more internal hard stops coupled with the second tube segment, wherein at least a portion of the first tube segment is stowed interior to the second tube segment; and
one or more joint preloaders coupled with at least the first tube segment or the second tube segment such that the one or more joint preloaders apply a force to engage each of the one or more external hard stops of the first tube segment with a respective one of the one or more internal hard stops of the second tube segment to form one or more engaged joints during deployment.

2. The system of claim 1, wherein each engaged joint maintains direct contact between one of the external hard stops of the first tube segment and one of the internal hard stops of the second tube segment during deployment.

3. The system of claim 1, wherein the one or more joint preloaders include one or more latches coupled with the second tube segment such that each latch from the one or more latches moves through a respective window from one or more windows formed within the second tube segment to engage the first tube segment.

4. The system of claim 3, further comprising a third tube segment, wherein:
the second tube segment is stowed interior to the third tube segment; and
the third tube segment includes one or more windows that each include a portion that engages a respective latch from the one or more latches coupled with the second tube segment.

5. The system of claim 4, wherein each of the one or more windows of the third tube segment that each include the portion that each engages one of the respective latches from the one or more latches coupled with the second tube segment constrains the respective latch in place until the second tube segment sequentially deploys after the first tube segment deploys and before the third tube segment deploys.

6. The system of claim 4, wherein each latch from the one or more latches coupled with the second tube segment includes one or more rollers.

7. The system of claim 6, wherein at least one of the one or more rollers engages the portion of a respective window from the one or more windows of the third tube segment.

8. The system of claim 5, wherein the portion of the respective windows from the one or more windows of the third tube segment include a ramped portion of the respective window.

9. The system of claim 8, wherein each latch coupled with the second tube segment is confined between the first tube segment and the ramped portion of the respective window of the third tube segment in a stowed state.

10. The system of claim 3, further comprising one or more compliant components configured such that one or more latches coupled with the second tube segment maintains contact with the first tube segment once engaged that facilitates maintaining contact between the external hard stops of the first tube and the respective internal hard stops of the second tube segment during deployment.

11. The system of claim 10, wherein the one or more complaint components form one or more flexible sections of the one or more latches coupled with the second tube segment.

12. The system of claim 10, wherein the one or more compliant components is coupled with the first tube segment.

13. The system of claim 12, wherein the one or more compliant components coupled with the first tube segment include a wave spring.

14. The system of claim 1, wherein the one or more joint preloaders include one or more flexures formed from a portion of the second tube segment, wherein the one or more flexures engage the first tube segment to apply the force to engage each of the one or more external hard stops of the first tube segment with the respective one of the one or more internal hard stops of the second tube segment to form one or more engaged joints during deployment.

15. The system of claim 1, wherein the one or more external hard stops of the first tube segment and the one or more internal hard stops of the second tube segment are segmented such the external hard stops of the first tube segment fit through gaps formed between the internal hard stops of the second tube segment.

16. The system of claim 1, further comprising an actuator that engages at least the first tube segment to advance at least the first tube segment.

17. The system of claim 16, wherein the actuator includes a lead screw.

18. The system of claim 17, wherein the lead screw disengages from the first tube segment and engages the second tube segment after the one or more joint preloaders apply the force to engage each of the one or more external hard stops of the first tube segment with the respective one of the one or more internal hard stops of the second tube segment to form the one or more engaged joints during deployment.

19. The system of claim 17, further comprising one or more rails coupled with an exterior surface of the first tube segment such that at least the first tube segment maintains alignment or the one or more rails counteract rotation from the lead screw during deployment.

20. The system of claim 6, wherein each of the one or more latches coupled with the second tube segment include an extended axle through at least one of the one or more rollers that constrains the respective latch from moving completely through the respective window of the second tube segment towards a center of the second tube segment.

* * * * *